US010891379B2

(12) United States Patent
Kawakita

(10) Patent No.: US 10,891,379 B2
(45) Date of Patent: Jan. 12, 2021

(54) PROGRAM ANALYSIS SYSTEM, PROGRAM ANALYSIS METHOD AND STORAGE MEDIUM

(71) Applicant: NEC Corporation, Tokyo (JP)

(72) Inventor: Masaru Kawakita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 173 days.

(21) Appl. No.: 16/092,803

(22) PCT Filed: Apr. 13, 2017

(86) PCT No.: PCT/JP2017/015088
§ 371 (c)(1),
(2) Date: Oct. 11, 2018

(87) PCT Pub. No.: WO2017/187999
PCT Pub. Date: Nov. 2, 2017

(65) Prior Publication Data
US 2019/0130108 A1  May 2, 2019

(30) Foreign Application Priority Data
Apr. 26, 2016  (JP) .................. 2016-088278

(51) Int. Cl.
*H04L 29/06* (2006.01)
*G06F 21/56* (2013.01)
(Continued)

(52) U.S. Cl.
CPC ............ *G06F 21/566* (2013.01); *G06F 21/44* (2013.01); *G06F 21/577* (2013.01); *H04L 63/1408* (2013.01); *G06F 2221/033* (2013.01)

(58) Field of Classification Search
CPC . G06F 21/51; H04L 63/1408; H04L 63/1416; H04L 63/1433
See application file for complete search history.

(56) References Cited

U.S. PATENT DOCUMENTS

2004/0255165 A1* 12/2004 Szor .................. G06F 21/566
 726/24
2005/0251570 A1 11/2005 Heasman et al.
(Continued)

FOREIGN PATENT DOCUMENTS

JP    2001-84136 A    3/2001
JP    2006-512667 A   4/2006
(Continued)

OTHER PUBLICATIONS

Wang et al. Clustering of Similar Malware Behavior via Structural Host-sequence Comparison 2013 IEEE 37th Annual Computer Software and Applications Conference (Year: 2013).*
(Continued)

*Primary Examiner* — David J Pearson

(57) ABSTRACT

A program analysis method according to an exemplary aspect of the present disclosure includes: generating an analysis-target abstract code that is data representing a mathematical model into which an inspection-target execution code is transformed; and determining whether or not the inspection-target execution code is a fraudulent program by executing at least processing of determining whether or not the analysis-target abstract code includes a known factor code that is data representing a mathematical model into which a known execution code is transformed, and processing of determining whether or not a state at an end of execution of the inspection-target execution code is included in success state information indicating a state in which an attack by a fraudulent program is successful.

9 Claims, 39 Drawing Sheets

(51) Int. Cl.
*G06F 21/44* (2013.01)
*G06F 21/57* (2013.01)

(56) References Cited

U.S. PATENT DOCUMENTS

| | | | | |
|---|---|---|---|---|
| 2007/0240217 | A1* | 10/2007 | Tuvell | G06F 21/565 726/24 |
| 2009/0049549 | A1* | 2/2009 | Park | G06F 21/552 726/22 |
| 2011/0010697 | A1* | 1/2011 | Golovkin | G06F 21/563 717/155 |
| 2014/0283037 | A1* | 9/2014 | Sikorski | G06F 21/563 726/22 |
| 2016/0232345 | A1* | 8/2016 | Moon | G06F 21/566 |
| 2017/0083702 | A1* | 3/2017 | Gathala | G06F 21/52 |

FOREIGN PATENT DOCUMENTS

| | | |
|---|---|---|
| JP | 2009-037545 A | 2/2009 |
| JP | 2012-27710 A | 2/2012 |
| JP | 2014-26421 A | 2/2014 |
| JP | 2014-519113 A | 8/2014 |
| JP | 5650617 B2 | 1/2015 |
| JP | 5655191 B2 | 1/2015 |
| JP | 5752642 B2 | 7/2015 |

OTHER PUBLICATIONS

R. Koike et al., "The Unknown Viruses Detection Method Using Bayes Learning Algorithm", IPSJ Journal, Aug. 2005, vol. 46, No. 8, pp. 1984-1988 (total 5 pages).
International Search Report dated Jul. 11, 2017, issued by the International Searching Authority in application No. PCT/JP2017/015088.
Written Opinion dated Jul. 11, 2017, issued by the International Searching Authority in application No. PCT/JP2017/015088 [PCT/ISA/237].
Japanese Office Action for JP Application No. 2018-514258 dated May 12, 2020 with English Translation.

* cited by examiner

Fig. 9

| INSTRUCTION TYPE | INSTRUCTION |
|---|---|
| SUBSTITUTION (MOVE) | mov, lea |
| ADDITION/SUBTRACTION | add, sub, neg |
| STACK MANIPULATION | push, pusha, pushad, pushfw, pop, popa, popad, popfw |
| NOT OPERATOR | not |

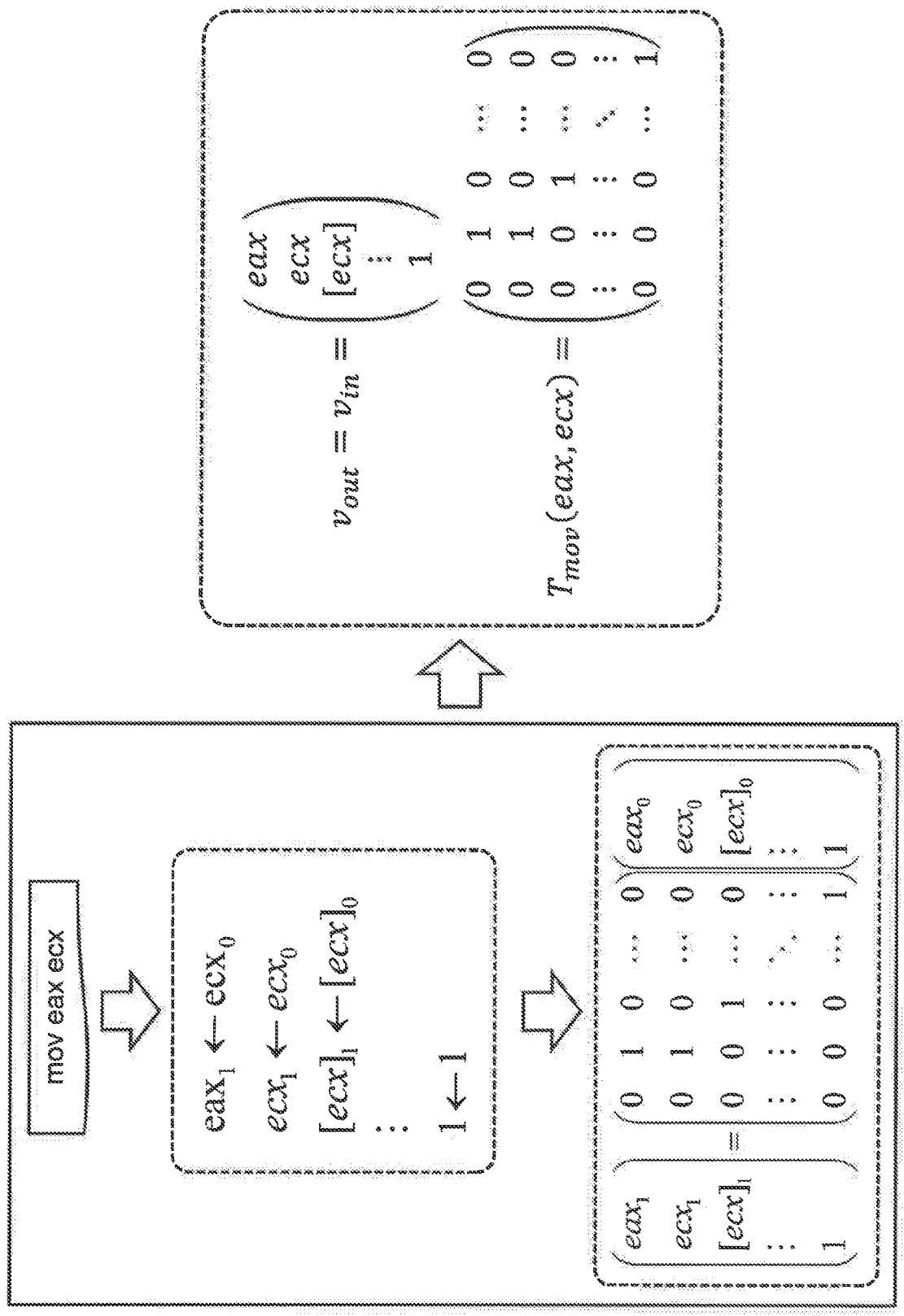

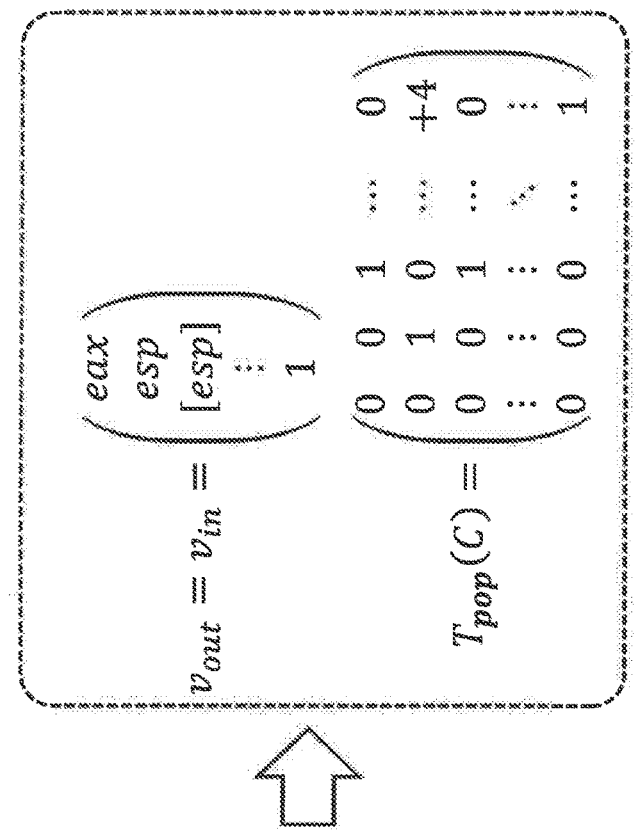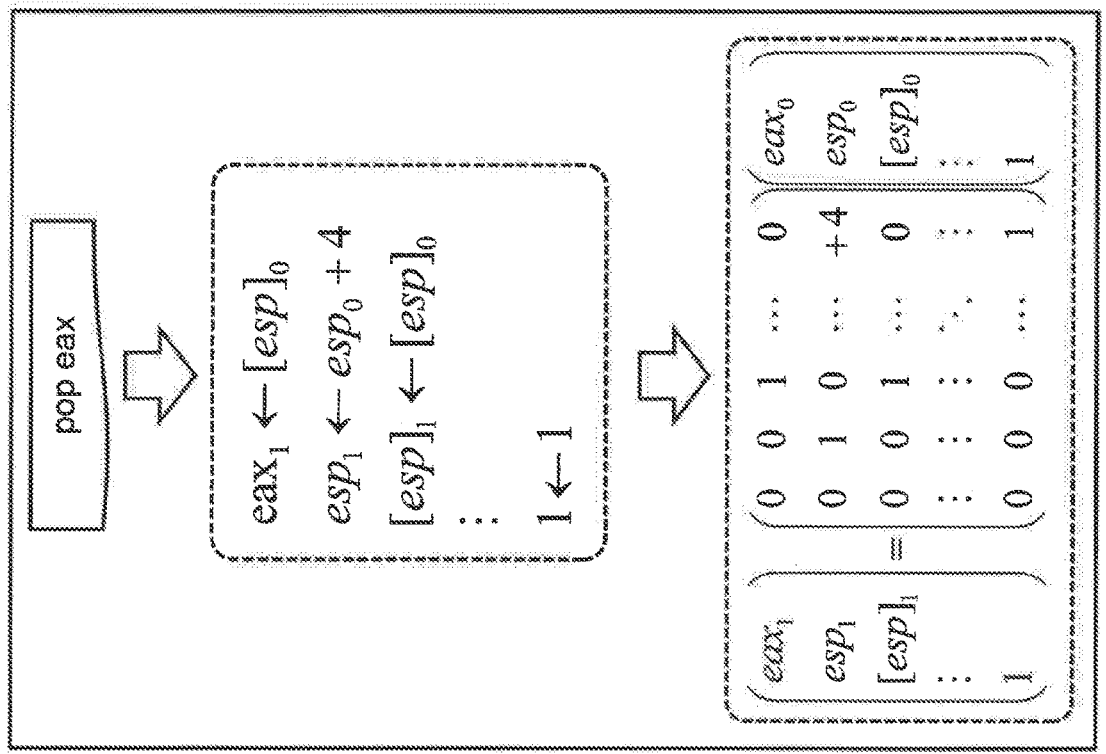
Fig. 10D

Fig. 12

| INSTRUCTION TYPE | INSTRUCTION |
|---|---|
| LOGICAL OPERATION | and, or, xor |
| COMPLICATED FOUR FUNDAMENTAL OPERATIONS | adc, mul, div, idiv |
| COMPARISON INSTRUCTION | cmp, test |
| CHARACTER STRING MANIPULATION | lodsb, lodsw, lodsd |
| FLAG MANIPULATION | pushfd, popdf |
| ZERO EXTENSION/SIGN EXTENSION | movzx, movsx, cbw, cdq, cwd, cwde |
| EXCHANGE INSTRUCTION | xadd, xchg |
| BIT OPERATION | rcl, rcr, rol, ror, sal, sar, shl, shr, shld, shrd |
| REPETITION INSTRUCTION | rep |
| OTHER INSTRUCTIONS | cpuid, rdmsr, rdpmc, rdtsc |

Fig. 20

| PRIORITY | VARIABLE | CALLING CONVENTION | PURPOSE |
|---|---|---|---|
| 1 | esp | Preserved | Stack Pointer |
| 2 | eax | Scratch | Accumulator Return Value |
| 3 | ebp | Preserved | Base Pointer |
| 4 | esi | Preserved | Source Index |
| 5 | edi | Preserved | Destination Index |
| 6 | ebx | Scratch(Windows) Preserved(Linux) | Base Register |
| 7 | ecx | Scratch | Counter This Pointer |
| 8 | edx | Scratch | Data Register |
| 9 | eflags | Scratch | Indicator |
| 10 | Other genuine registers | – | – |
| 11 | Virtual registers | – | – |
| 12 | Memory References | – | – |
| 13 | Constant values | – | – |

Fig. 22

| TRANSFORMATION INFORMATION (DICTIONARY DATA) | |
|---|---|
| INSTRUCTION SEQUENCE | MATHEMATICAL MODEL (MAPPING) |
| (push A) | $(esp) = (1\ -4) \times \begin{pmatrix} esp \\ 1 \end{pmatrix}$<br>$[esp] = (1) \times (A)$ |
| (mov A,B) | $(A) = (1) \times (B)$ |
| (sub A,C) | $(A) = (1\ -C) \times \begin{pmatrix} esp \\ 1 \end{pmatrix}$ |
| (mov A, DWORD PTR[B+C]) | $(A) = (1) \times ([B+C])$ |
| (mov DWORD PTR[A+C],B) | $([A+C]) = (1) \times (B)$ |
| (leave) | $\begin{pmatrix} ebp \\ esp \end{pmatrix} = \begin{bmatrix} 0 & 1 & 0 \\ 1 & 0 & 4 \end{bmatrix} \times \begin{pmatrix} ebp \\ [ebp] \\ 1 \end{pmatrix}$ |
| (lea A DWORD [B+C]) | $(A) = (1\ C) \times \begin{pmatrix} B \\ 1 \end{pmatrix}$ |
| ... | ... |

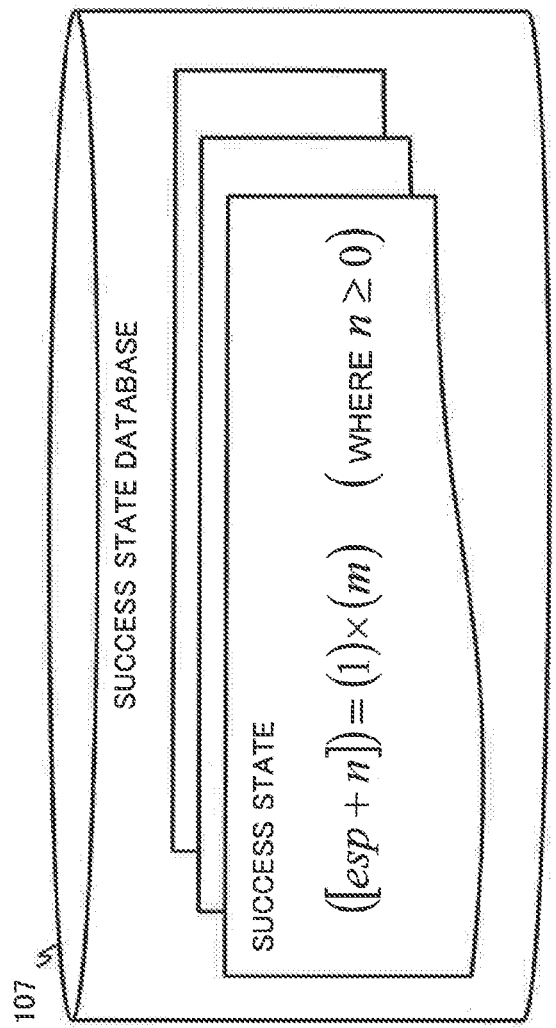

Fig. 25B

| ROW NUMBER | INSTRUCTION SEQUENCE | MATHEMATICAL MODEL (MAPPING) |
|---|---|---|
| 1 | push ebp | $(esp) = (1 \quad -4) \times \begin{pmatrix} esp \\ 1 \end{pmatrix}$<br>$[esp] = (1) \times (ebp)$ |
| 2 | mov ebp,esp | $(ebp) = (1) \times (esp)$ |
| 3 | sub esp,0x10 | $(esp) = (1 \quad -10) \times \begin{pmatrix} esp \\ 1 \end{pmatrix}$ |
| 4 | mov eax,DWORD PTR [ebp+0x8] | $(eax) = (1) \times ([ebp+8])$ |
| 5 | mov eax,DWORD PTR [eax] | $(eax) = (1) \times ([eax])$ |
| 6 | mov DWORD PTR [ebp-0x4],eax | $([ebp-4]) = (1) \times ([eax])$ |
| 7 | mov eax,DWORD PTR [ebp+0x8] | $(eax) = (1) \times ([ebp+8])$ |
| 8 | mov eax,DWORD PTR [eax+0x4] | $(eax) = (1) \times ([eax+4])$ |
| 9 | mov DWORD PTR [ebp+0x18c],eax | $([ebp+18c]) = (1) \times (eax)$ |
| 10 | mov eax,DWORD PTR [ebp-0x4] | $(eax) = (1) \times ([ebp-4])$ |
| 11 | leave | $\begin{pmatrix} ebp \\ esp \end{pmatrix} = \begin{pmatrix} 0 & 1 & 0 \\ 1 & 0 & 4 \end{pmatrix} \times \begin{pmatrix} ebp \\ [ebp] \\ 1 \end{pmatrix}$ |
| 12 | ret | (RETURN) |

Fig. 26A

ABSTRACT CODE 2601

$$\begin{pmatrix} eax \\ [esp+392] \\ [esp-8] \end{pmatrix} = \begin{pmatrix} 1 & 0 \\ 0 & 1 \\ 1 & 1 \end{pmatrix} \times \begin{pmatrix} [[esp+4]+0] \\ [[esp+4]+4] \end{pmatrix}$$

Fig. 26B

FACTOR CODE 2602

$(eax) = (1) \times ([[esp + 4] + 0])$ $([esp + 392]) = (1) \times ([[esp + 4] + 4])$ $([esp - 8]) = (1) \times ([[esp + 4] + 0])$

Fig. 27

EXECUTION CODE 2701

```
1:   55              push   ebp
2:   89 e5           mov    ebp,esp
3:   83 ec 10        sub    esp,0x10
4:   8d 45 f4        lea    eax,[ebp-0xc]
5:   89 45 fc        mov    DWORD PTR [ebp-0x4],eax
6:   8b 45 08        mov    eax,DWORD PTR [ebp+0x8]
7:   8b 10           mov    edx,DWORD PTR [eax]
8:   8b 45 fc        mov    eax,DWORD PTR [ebp-0x4]
9:   89 10           mov    DWORD PTR [eax],edx
10:  8b 45 08        mov    eax,DWORD PTR [ebp+0x8]
11:  8b 50 04        mov    edx,DWORD PTR [eax+0x4]
12:  8b 45 fc        mov    eax,DWORD PTR [ebp-0x4]
13:  89 10           mov    DWORD PTR [eax],edx
14:  8b 45 f4        mov    eax,DWORD PTR [ebp-0xc]
15:  c9              leave
16:  c3              ret
```

Fig. 28A

ABSTRACT CODE 2801

$$\begin{pmatrix} eax \\ [esp-8] \\ [esp-12] \\ edx \end{pmatrix} = \begin{pmatrix} 1 & 0 \\ 1 & 0 \\ 0 & 1 \\ 0 & 1 \end{pmatrix} \times \begin{pmatrix} [esp+4]+0 \\ [esp+4]+4 \end{pmatrix}$$

FACTOR CODE 2802

$(eax) = (1) \times (([[esp+4]]+0])$ $[[esp-8]] = (1) \times (([[esp+4]]+0])$ $[[esp-12]] = (1) \times (([[esp+4]]+4])$ $([edx]) = (1) \times (([[esp+4]]+4])$

PROGRAM ANALYSIS SYSTEM, PROGRAM ANALYSIS METHOD AND STORAGE MEDIUM

This application is a National Stage Entry of PCT/JP2017/015088 filed on Apr. 13, 2017, which claims priority from Japanese Patent Application 2016-088278 filed on Apr. 26, 2016, the contents of all of which are incorporated herein by reference, in their entirety.

TECHNICAL FIELD

The present disclosure relates to a program analysis system and the like capable of detecting a fraudulent program from an analysis result of a computer program.

BACKGROUND ART

Security threats caused by fraudulent programs (e.g. malware) providing a fraudulent instruction for a computer in an organization, or an important facility (e.g. an infrastructure) have occurred recently. As one of security countermeasures for reducing such threats, detection of malware by use of a method with a high degree of certainty may be considered.

For example, there are known technologies related to the security countermeasures as follows.

PTL 1 discloses a technology related to a monitoring device storing a set of an attack universal resource locator (URL) where an attack code is placed and an entry URL connected to the attack URL as a malicious URL set, and monitoring access to the entry URL included in the malicious URL set.

PTL 2 discloses a technology of extracting, from communication data, other feature information (e.g. URL path information) different from feature information related to a known attack and expecting to detect communication data related to an unknown attack by identifying another piece of communication data including the other feature information.

PTL 3 discloses a technology of performing clustering on attack information [e.g. an Internet Protocol (IP) address or a URL related to a malware activity] collected by use of a plurality of decoy systems and extracting an area (e.g. an IP address or a URL) in which a plurality of overlapping pieces of attack information collected by different types of decoy systems are likely to exist.

PTL 4 discloses a technology related to a malware analysis system generating a signature of malware by analyzing a sample of the malware gathered by use of a virtual machine environment.

PTL 5 discloses a technology related to a method of determining whether or not an execution code is a malicious code (e.g. malware), by emulating the execution code.

Further, the following technologies are known in fields other than the security countermeasures.

PTL 6 discloses a technology related to a system generating a test specification from a specification or a control flow diagram generated based on a source program, by use of a reverse engineering tool.

PTL 7 discloses a technology of delimiting a character string read from input data and a preregistered character string, respectively, by use of delimiters, and checking the character strings against each other, based on a degree of agreement between the respective delimited character strings.

CITATION LIST

Patent Literature

[PTL 1] Japanese Patent No. 5752642
[PTL 2] Japanese Patent No. 5655191
[PTL 3] Japanese Patent No. 5650617
[PTL 4] Japanese Translation of PCT International Application Publication No. 2014-519113
[PTL 5] Japanese Translation of PCT International Application Publication No. 2006-512667
[PTL 6] Japanese Unexamined Patent Application Publication No. 2001-084136
[PTL 7] Japanese Unexamined Patent Application Publication No. 2014-026421

SUMMARY OF INVENTION

Technical Problem

Analyzing a content of malware and deterring an attack by the malware is generally not easy. For example, analysis of unknown malware such as a new type of malware and malware executing an attack using an unknown vulnerability or the like (zero-day attack) may be required.

On the other hand, the technology disclosed in PTL 1 described above is a technology of blocking access to a URL where an attack code such as malware exists and is not a technology capable of analyzing whether or not a certain code is an attack code. The technology disclosed in PTL 2 described above is a technology of detecting malware by analyzing communication data related to a communication executed by the malware and is not a technology capable of analyzing malware itself. The technology disclosed in PTL 3 described above is a technology of extracting attack information such as an IP address or a URL related to an activity of malware and is not a technology of analyzing malware itself. The technology disclosed in PTL 4 described above is a technology of analyzing a behavior of malware by use of a virtual machine (VM) environment. When the malware detecting analysis in the VM environment changes the behavior, the malware may not be properly analyzed. The technology disclosed in PTL 5 is a technology of emulating an execution code after predefining a state in which malicious processing is executed. Accordingly, an unknown attack an activity content of which cannot be predicted may not be sufficiently handled. Additionally, neither of the technologies disclosed in PTLs 6 and 7 is a technology related to malware analysis.

The technology according to the present disclosure has been conceived in view of the circumstances as described above. Specifically, a main object of the technology according to the present disclosure is to provide a program analysis system and the like capable of properly analyzing a content of a program to be inspected.

Solution to Problem

A program analysis system according to an exemplary aspects of the present disclosure includes: factor code holding means for holding a known factor code that is data representing a mathematical model into which a known execution code transformed; success state holding means for holding success state information indicating a state in which an attack by a fraudulent program is successful; and factor search means for determining whether or not an inspection-target execution code is a fraudulent program by executing at least processing of generating an analysis-target abstract code that is data representing a mathematical model into which the inspection-target execution code is transformed and determining whether or not the analysis-target abstract code includes the known factor code held in the factor code holding means, and processing of determining whether or not a state at an end of execution of the inspection-target execution code is included in the success state information held in the success state holding means.

A program analysis method according to an exemplary aspects of the present disclosure includes: generating an analysis-target abstract code that is data representing a mathematical model into which an inspection-target execution code is transformed; and determining whether or not the inspection-target execution code is a fraudulent program by executing at least processing of determining whether or not the analysis-target abstract code includes a known factor code that is data representing a mathematical model into which a known execution code is transformed, and processing of determining whether or not a state at an end of execution of the inspection-target execution code is included in success state information indicating a state in which an attack by a fraudulent program is successful.

Further, the object is also achieved by a computer program providing a program analysis system and a program analysis method that include the aforementioned configurations by a computer, a computer-readable storage medium storing the computer program, and the like.

Advantageous Effects of Invention

The technology according to the present disclosure can properly analyze a content of a program to be inspected.

BRIEF DESCRIPTION OF DRAWINGS

FIG. 9 is a diagram illustrating specific examples of instruction sequences transformable to linear functions.

FIG. 10A is a diagram illustrating a specific example of transforming a specific instruction (a "mov" instruction) into a mapping.

FIG. 10D is a diagram illustrating a specific example of transforming a specific instruction (a "pop" instruction) into a mapping.

FIG. 12 is a diagram illustrating specific examples of instruction sequences transformable to nonlinear instructions.

FIG. 20 is a diagram illustrating an example of priority related to elements (variables) in an input vector and an output vector.

FIG. 22 is a diagram illustrating a specific example of transformation information associating an instruction sequence with an abstract code.

FIG. 24 is a diagram illustrating a specific example of a success state database according to the first example embodiment of the present disclosure.

FIG. 25B is a diagram illustrating a specific example of transforming the inspection-target execution code illustrated in FIG. 25A into mathematical models.

FIG. 26A is a diagram illustrating a specific example of an abstract code transformed from the execution code exemplified in FIG. 25A.

FIG. 26B is a diagram illustrating a specific example of a factor code decomposed from the abstract code exemplified in FIG. 26A.

FIG. 27 is a diagram illustrating a specific example of a known execution code.

FIG. 28A is a diagram illustrating a specific example of an abstract code transformed from the execution code exemplified in FIG. 27.

EXAMPLE EMBODIMENT

Figure 1A:
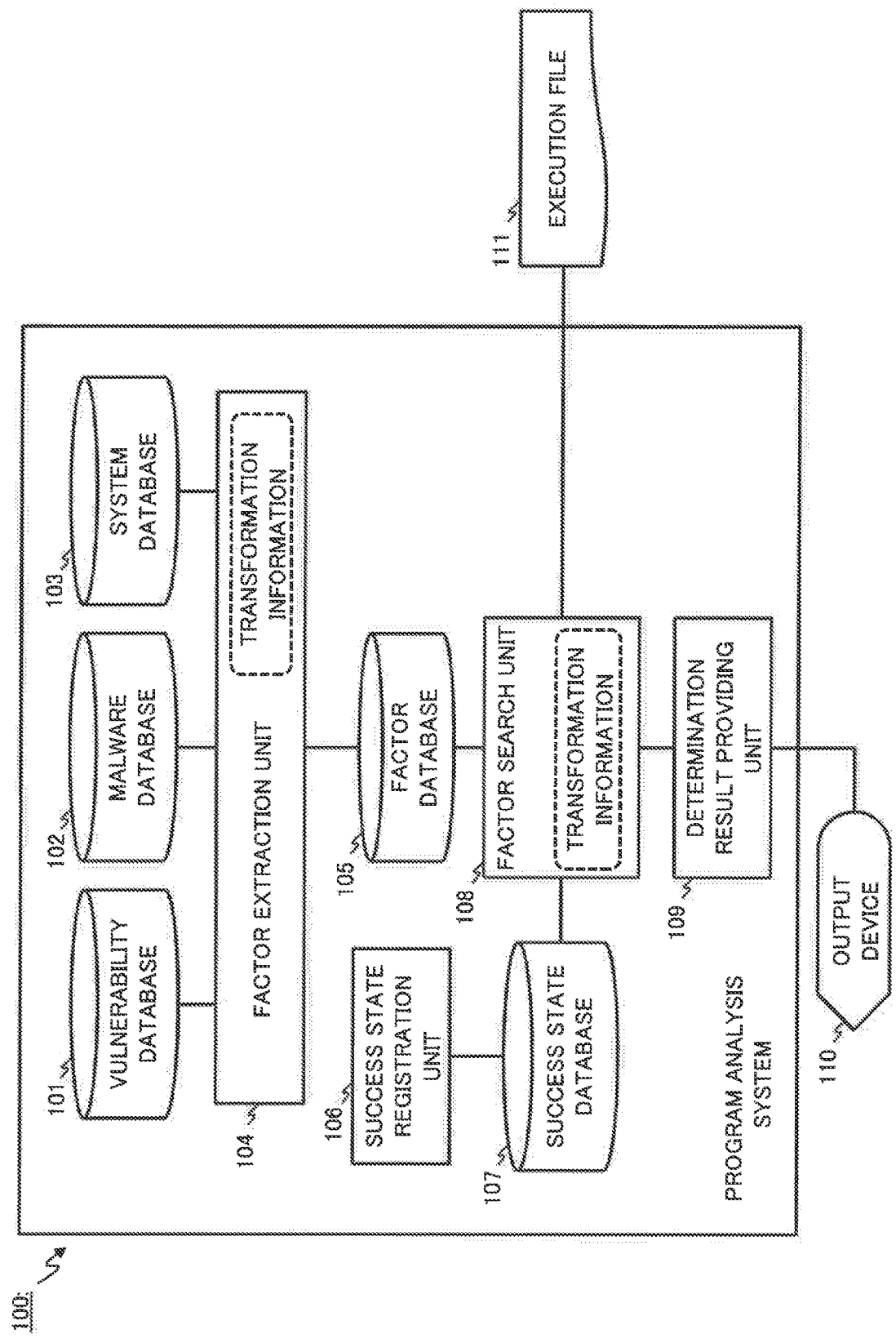
FIG. 1A is a block diagram exemplifying a functional configuration of a program analysis system according to a first example embodiment of the present disclosure.

Prior to description of example embodiments of the present invention, technical considerations and the like related to the present invention will be described in more detail.

As described above, security threats caused by fraudulent programs (e.g. a zero-day attack due to an unknown vulnerability, and a cyber attack including a continuous activity by malware planted through the attack and the like) have become a problem. The fraudulent programs include a fraudulent program executing an attack using an unknown vulnerability and a fraudulent program executing an attack using a known vulnerability. In general, a behavior and a structure of a fraudulent program using an unknown vulnerability are not known in most cases. Even a behavior and a structure of a fraudulent program using a known vulnerability may not be known.

From a viewpoint of reducing security threats such as a cyber attack, it is useful to find a fraudulent program using an unknown vulnerability or a fraudulent program capable of being active for a long term, and accumulate knowledge about the fraudulent program.

From a viewpoint of improving security intensity of an information system, execution of a security-related test (e.g. a penetration test using a fraudulent program) on the information system may be considered. For example, a fraudulent program using a well-known vulnerability may be detected by a common security countermeasure method (e.g. antivirus software or an intrusion prevention system). When confirming that a system can withstand a highly intensive (powerful) attack, it is useful to test the system by use of, for example, not only a fraudulent program using a well-known vulnerability but also a hard-to-find fraudulent program.

For example, a fraudulent program using an unknown vulnerability may be found by analyzing a program using a known vulnerability and searching for another program including a component of the program (or a combination of the components). Further, processing by a fraudulent program capable of being continuously (for a long-term) active may not be easily distinguished from regular (legitimate) processing executed by a system, and a code size of the fraudulent program itself may be small (a code length may be short). Taking such a characteristic into consideration, it is considered that a fraudulent program capable of being continuously active (hard-to-find) may be acquired by analyzing a known fraudulent program and regular processing executed by the system, and using a component of the program (or a combination of the components).

For example, a program analysis system described by use of the following respective example embodiments analyzes codes of a known vulnerability (a program with a vulnerability), a fraudulent program, and a program related to regular processing executed by a system, and acquires components (may be referred to as factor codes) of the codes. For example, such a program analysis system may be configured to search for a fraudulent program using a vulnerability, by use of analyzed factor codes (including a combination of the codes). Such search processing may include determination processing about whether or not a program (execution code) is a fraudulent program. Further, such a program analysis system may be configured to acquire a fraudulent program for testing [e.g. a fraudulent program capable of being continuously active (hard-to-find)] by processing a fraudulent program by use of the aforementioned factor codes. Specifically, the program analysis system may be configured to reduce a size of a fraudulent code included in a fraudulent program, by replacing (or combining) at least part of the fraudulent program with another factor code.

By configuring the program analysis system according to the present disclosure as described above, for example, an attack caused by an unknown fraudulent program may be deterred. The reason is that the program analysis system according to the present disclosure can determine whether or not an unknown fraudulent program includes an attack factor, by comparing a factor code acquired by the aforementioned analysis with a factor code included in the unknown fraudulent program. Further, the program analysis system according to the present disclosure can determine whether or not a state after executing a fraudulent program is a state of an attack being successful (success state).

Further, by thus configuring the program analysis system according to the present disclosure, for example, a capability to detect an activity by a fraudulent program capable of being continuously active may be improved. The reason is as follows. Taking into consideration a characteristic that a fraudulent program performing a continuous activity has a smaller code size compared with another fraudulent program, the program analysis system reduces a size of a code by replacing a factor code constituting a fraudulent program to be inspected. Consequently, such a program analysis system can generate an execution code applicable to an inspection (test) assuming intrusion of a fraudulent program with a relatively small code size. In other words, such a program analysis system enables implementation of a penetration test using a fraudulent program with a relatively small code size.

By configuring the program analysis system according to the present disclosure as described above, a content of a program to be inspected may be properly analyzed, and by use of the result, an attack by a fraudulent program may be controlled.

The program analysis system according to the present disclosure will be described in detail below by use of the respective example embodiments. A configuration of the program analysis system described in each of the following example embodiments is an exemplification, and the technical scope of the present invention is not limited to the configuration. Allocation (e.g. division by functional units) of components constituting the program analysis system according to each of the following example embodiments is an example capable of providing the program analysis system. When implementing the program analysis system, various configurations are assumed without being limited to the following exemplifications. Specifically, a component constituting the program analysis system according to each of the following example embodiments may be further divided. Further, one or more components constituting the program analysis system according to each of the example embodiments may be integrated.

The program analysis system described below may be configured by use of a single device (a physical or virtual device) or may be provided by use of a plurality of separate devices (physical or virtual devices). When the program analysis system is configured with a plurality of devices, the respective devices may be communicably connected by a wireline, a wireless line, or a communication network (communication line) properly combining the lines. Such a communication network may be a physical communication network or a virtual communication network. A hardware configuration capable of providing the program analysis system described below or components of the system will be described later.

First Example Embodiment

[Configuration]
A first example embodiment capable of providing the technology according to the present disclosure will be described with reference to drawings. FIG. 1A is a block diagram exemplifying a functional configuration of a program analysis system 100 according to the present example embodiment. It is assumed in the present example embodiment that a fraudulent program is malware. Note that fraudulent programs being targets of the present disclosure may include a program other than malware.

As exemplified in FIG. 1A, the program analysis system 100 according to the present example embodiment includes a vulnerability database 101, a malware database 102, and a system database 103. Further, the program analysis system 100 includes a factor extraction unit 104 and a factor database 105. Further, the program analysis system 100 includes a success state registration unit 106 and a success state database 107. Further, the program analysis system 100 includes a factor search unit 108 and a determination result providing unit 109. The program analysis system 100 may be communicably connected to an output device 110.

The vulnerability database 101 can hold (store) a specimen of an attack code being an execution code executing an attack using a vulnerability. For example, a specimen of an attack code may be represented by one or more instruction sequences in which processing of attacking a known vulnerability is implemented. A specimen of an attack code may be an execution file including the attack code. Other than the above, the vulnerability database 101 may hold a specimen of an execution code related to a program including a known vulnerability. The vulnerability database 101 may be hereinafter referred to as a vulnerability data holding unit (vulnerability data holding means).

The malware database 102 can hold a specimen of known malware. For example, a specimen of malware may be at least part of an execution code of the malware or may be the execution code of the malware itself. A specimen of known malware may be collected by a proper method including a well-known method. A configuration capable of providing the malw are database 102 is not particularly limited. The malware database 102 may be hereinafter referred to as a fraudulent program data holding unit (fraudulent program data holding means).

The system database 103 can hold a specimen related to an operating system (OS) or an application used in a normally operating system. For example, a specimen held in the system database 103 may be a library or an execution file constituting an OS, or a library or an execution file constituting an application. The system database 103 may be hereinafter referred to as a system data holding unit (system data holding means).

It is assumed that a sufficient amount of specimens are previously held in each of the aforementioned databases.

The factor extraction unit 104 can execute processing of extracting a factor code (to be described later) from specimens acquired from the vulnerability database 101, the malware database 102, and the system database 103. The factor extraction unit 104 (factor extraction means) registers an extracted factor code in the factor database 105. The factor extraction unit 104 may register in the factor database 105 a factor code and an execution code of a specimen from which the factor code is extracted, the two being associated with one another. Further, for example, the factor extraction unit 104 may register in the factor database 105 a factor code and information by which a database (the vulnerability database 101, the malware database 102, or the system database 103) holding a specimen code from which the factor code is extracted can be identified, the two being associated with one another. Specific processing in the factor extraction unit 104 will be described later.

The factor database 105 can hold a factor code extracted by the factor extraction unit 104. The factor database 105 may be hereinafter referred to as a factor code holding unit (factor code holding means). Further, a factor code held by the factor database 105 may be referred to as a known factor code.

For example, the success state registration unit 106 can provide a function of registering in the success state database 107 data indicating a state of an attack on an attack target (an information processing device such as a computer, or an information processing system including an information processing device) being successful (may be hereinafter referred to as a "success state"). For example, by use of the success state registration unit 106, a user of the program analysis system 100 can register in the program analysis system 100 (the success state database 107 in particular) a state (value) of a variable indicating a situation of an attack on an attack target being successful (e.g. a situation of being deprived of control of a computer by an attack program). For example, such a state of a variable may indicate a state of a register or a specific memory area. Further, for example, such a state of a variable may indicate a state of various types of files, a registry, or the like.

The success state database 107 can hold data indicating a success state registered by the success state registration unit 106. The success state database 107 may be hereinafter referred to as a success state holding unit (success state holding means).

The factor search unit 108 transforms an execution file 111 (to be described later) into an abstract code (to be described later). Further, the factor search unit 108 can execute processing of confirming whether or not a factor code held in the factor database 105 (known factor code) is included in a transformed abstract code. Further, based on the processing result, the factor search unit 108 can execute processing of determining whether or not an execution file includes a fraudulent file such as malware. An abstract code transformed from the execution file 111 may be hereinafter referred to as an "analysis-target abstract code."

The execution file 111 is a file on which inspection of whether or not a fraudulent program such as malware is included is executed. The execution file 111 is not registered in any one of the vulnerability database 101, the malware database 102, and the system database 103, and is input to the program analysis system 100. The execution file 111 is not limited to a file in an executable format and may be a library file or the like.

Based on a determination result by the factor search unit 108, the determination result providing unit 109 can execute processing of generating information indicating whether or not a vulnerability exists (result information). Such result information may be represented by a character (text) or may be represented by a diagram. The determination result providing unit 109 can provide result information for the output device 110.

The output device 110 can output result information provided by the determination result providing unit 109. A method of the output device 110 outputting result information is not particularly limited and may be appropriately selected. For example, the output device 110 may display result information by use of various types of display devices, may output the result information to a file, or may transmit the result information to another device.

A configuration capable of providing each of the aforementioned databases (the vulnerability database 101, the malware database 102, the system database 103, the factor database 105, and the success state database 107) is not particularly limited. For example, each of the aforementioned databases may be provided by use of various types of database software or may be provided by use of a file in a file system.

Figure 1B:
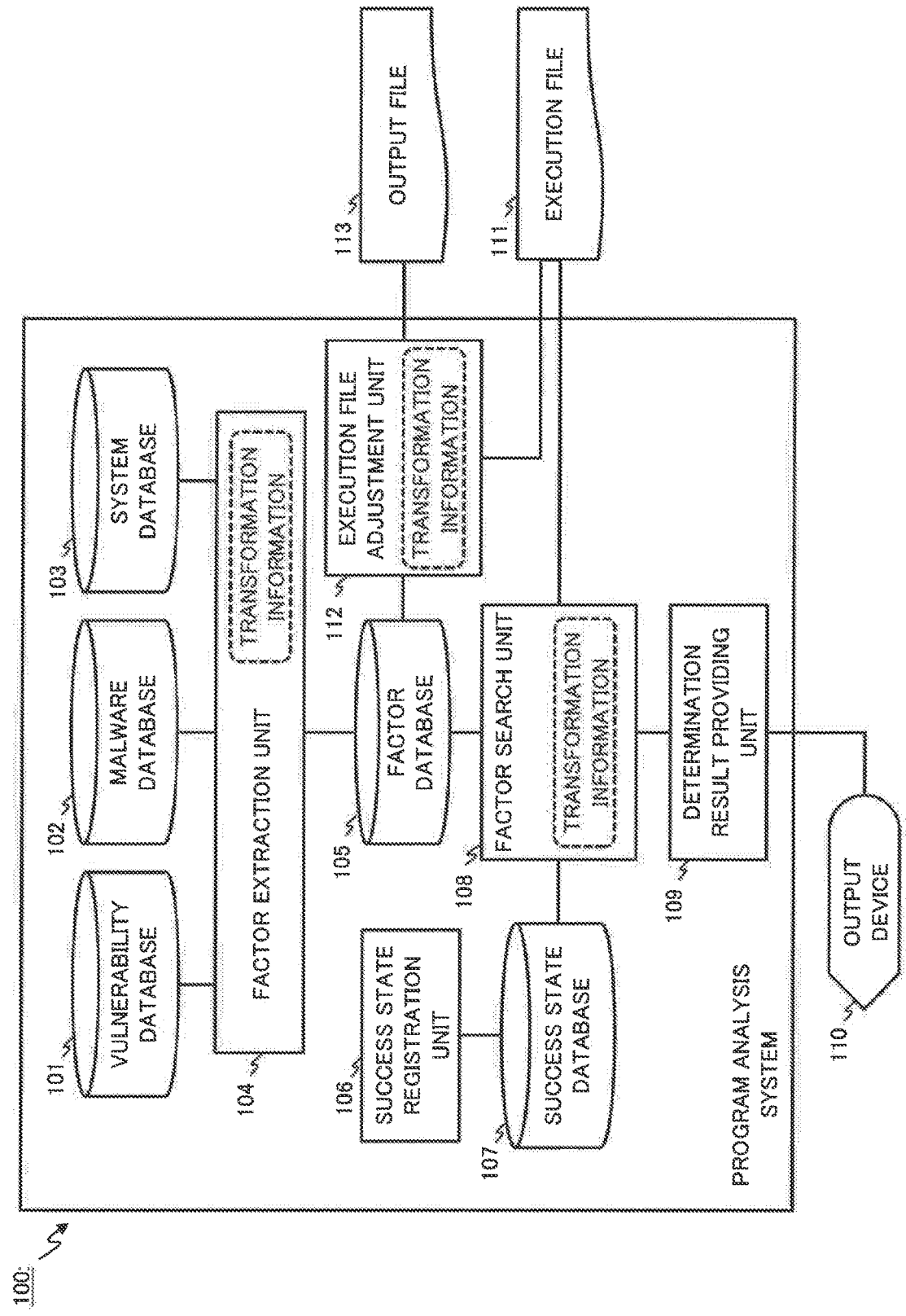
FIG. 1B is a block diagram exemplifying a functional configuration of a modified example of the program analysis system according to the first example embodiment of the present disclosure.

As a modified example, the program analysis system 100 may include an execution file adjustment unit 112 as exemplified in FIG. 1B. The execution file adjustment unit 112 (execution file adjustment means) can execute processing of confirming whether or not a size of the execution file 111 can be reduced (shortened). The execution file adjustment unit 112 can execute processing of generating an output file 113 being able to execute processing similar to that by the execution file 111 and having a size smaller than the execution file 111. Specific processing in the execution file adjustment unit 112 will be described later.

The output file 113 is an execution file having a size smaller than the execution file 111 and being able to execute processing similar to the execution file 111. For example, the output file 113 may be an execution file obtained by replacing part of the execution file 111 by use of another code.

[Mathematical Model]

Transformation of an execution code into a mathematical model, the transformation being executed by the program analysis system 100 according to the present example embodiment and the modified example thereof, will be described below. Data indicating a mathematical model representation described below correspond to the abstract code described above. For convenience of description, it is hereinafter assumed that an execution code is represented by an instruction sequence executable in an x86 architecture (32-bit) from Intel (registered trademark). Note that the present example embodiment is not limited to the above and is applicable to another architecture.

A fraudulent program such as malware includes an instruction sequence executing malicious processing. Further, a program that may be attacked by malware or the like may include an instruction sequence corresponding to a vulnerable execution code.

Since there may be a plurality of combinations of instruction sequences that can provide certain processing, analysis of complex combinations of instruction sequences is not necessarily easy. Accordingly, the program analysis system 100 transforms (abstracts) an instruction sequence included in an execution code into a mapping being a mathematical model and expresses processing by a series of instruction sequences as a composite of mappings. Consequently, the program analysis system 100 can make an analysis of an execution code (e.g. a determination of an attack code or not, a determination of a code including a vulnerability or not, a determination of similarity of a code, and a determination of replaceability of a code) by use of a mathematical model transformed from the execution code.

For example, a state of a system (e.g. computer) when an "n-th" (where "n" is a natural number) instruction is executed is denoted as "$S_n$," a mathematical model of a normal execution code is denoted as "A," and a mathematical model of an attack code is denoted as "B." It is assumed that the system state "$S_n$" includes states of a register, a memory, a storage medium, and the like that are included in the system.

For example, a state transition of the system when the normal execution code is executed is expressed by the following equation. In the following equation, "$S_n$" is considered as an input with respect to the mathematical model "A," and "$S_{n+1}$" is considered as an output with respect to the mathematical model "A.".

$$S_{n+1} = A \times S_n, \text{ where } S = \begin{Bmatrix} eax \\ ecx \\ esp \\ \vdots \\ eip \\ [esp] \\ [esp+4] \\ \vdots \\ 1 \end{Bmatrix}$$

(eax, ecx, esp and eip denote registers, and [esp] and [esp+4] denote memory references described later.)

For example, a state transition of the system when the attack code is executed may be expressed by the following equation.

$$S_{n+1} = B \times S_n = C_{diff} \times A \times S_n, \text{ (where } B = C_{diff} \times A)$$

When a relation "$B = C_{diff} \times A$" is satisfied in the equation above, the mathematical model "B" representing the attack code may be expressed by use of a combination of the mathematical model "A" representing the normal execution code and a difference "$C_{diff}$." For example, it is considered that a feature unique to the attack code (the difference "$C_{diff}$") may be reduced by selecting a mathematical model "A" decreasing the difference "$C_{diff}$." Further, since the difference "$C_{diff}$" is considered to be a feature unique to the attack code, it is considered that an execution code transformed into a mathematical model corresponding to the difference "$C_{diff}$" may be an attack code.

Based on the basic concept as described above, the program analysis system 100 (the factor extraction unit 104, the factor search unit 108, and the execution file adjustment unit 112, in particular) transforms instruction sequences included in an execution code into a composite of mappings (functions representing mappings) being a mathematical model. The program analysis system 100 places an output vector (to be described later) on the left side of a function representing a mapping transformed from a certain instruction sequence and places an input vector (to be described later) at the end of the right side. The input vector is handled as an argument to the function representing the mapping.

Figure 7:
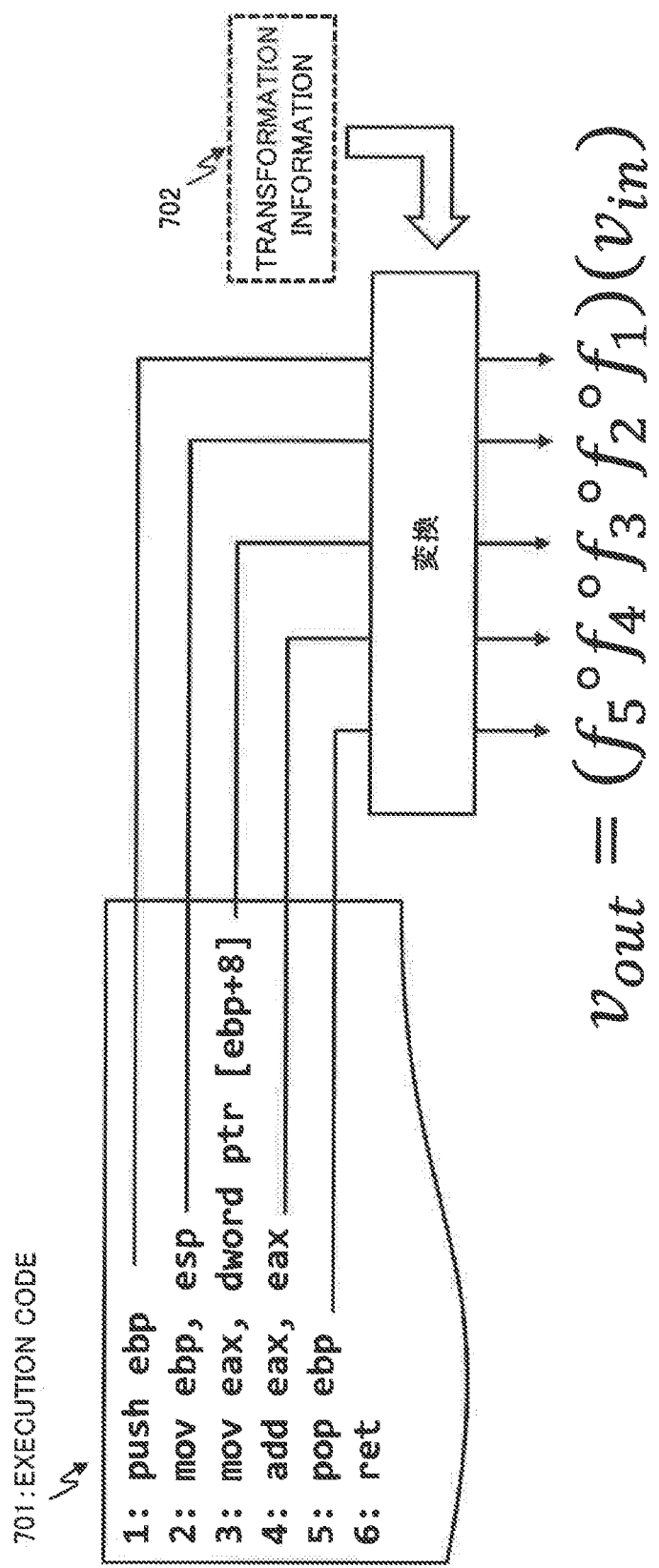
FIG. 7 is a diagram schematically illustrating transformation of an instruction sequence into a mapping, by use of a specific example.

Describing the above by use of a specific example exemplified in FIG. 7, instruction sequences included in an execution code 701 are transformed into mappings "$f_1$" to "$f_5$," respectively. The program analysis system 100 can transform an instruction included in an execution code into a mapping handling states of a register, a memory (memory area), and the like as arguments and return values. In this case, a number of mappings for one instruction may be more than one. For example, the program analysis system 100 may hold transformation information (702 in FIG. 7) associating an instruction sequence with a mapping into which the instruction sequence is transformed and transform an instruction sequence into a mapping by use of the transformation information. For example, such transformation information may be dictionary data associating an instruction sequence with a mapping.

Further, "$v_{in}$" exemplified in FIG. 7 is an input vector with respect to a mapping transformed from an instruction sequence. Further, "$v_{out}$" is an output vector with respect to the mapping transformed from the instruction sequence.

The input vector and the output vector with respect to a mapping that are described above will be described below. Each of the input vector and the output vector is expressed by use of a variable vector including any one or more of elements being a "real register," a "virtual register," and a "memory reference." An element of a variable vector (i.e. an element of an input vector and an output vector) may be hereinafter simply referred to as a "variable."

For example, a real register refers to a register implemented in an arithmetic device [central processing unit (CPU)] constituting an information processing device in which malware or the like is executed. A real register may be associated with a register name. As a specific example, the aforementioned real register may be a general-purpose register (GPR) in the x86 architecture by Intel (registered trademark). For example, a specific example of a variable vector including a real register may be expressed as the following equation.

$$v = \begin{pmatrix} eax \\ ebx \\ ecx \\ \vdots \\ esp \end{pmatrix}$$

A virtual register is a virtual register introduced for convenience of calculation in the program analysis system 100. Such a virtual register does not need to be implemented in an actual CPU. A virtual register may be associated with a register name indicating the virtual register.

A memory reference is an element indicating a content stored in a memory (e.g. a main memory) constituting an information processing device in which malware and the like is executed. Specifically, an element of a memory reference indicates a content of an address (an address of a memory area) indicated by the element. A memory reference includes an element and an address width. For example, an element of a memory reference may be denoted in a form enclosed by brackets "[" and "]" as indicated in the following equation. Further, an element of a memory reference may be associated with a number of bits (e.g. "ref8," "ref16," and "ref32") indicating an address width. A part enclosed by brackets "[" and "]" in a memory reference indicates an address of a memory to be referred to. The part enclosed by brackets "[" and "]" in a memory reference may be hereinafter referred to as an "address part."

$$v = \begin{pmatrix} [DISP]_{ref32} \\ [MODRM]_{ref16} \\ \vdots \\ [400000h]_{ref8} \end{pmatrix}$$

Since an information processing device handles a vast memory area, an amount of calculation may increase when a state of an entire memory area is included in an element of a variable vector. Accordingly, an area directly involved in input-output in a memory area may be included in an element of a variable vector.

Figure 8:
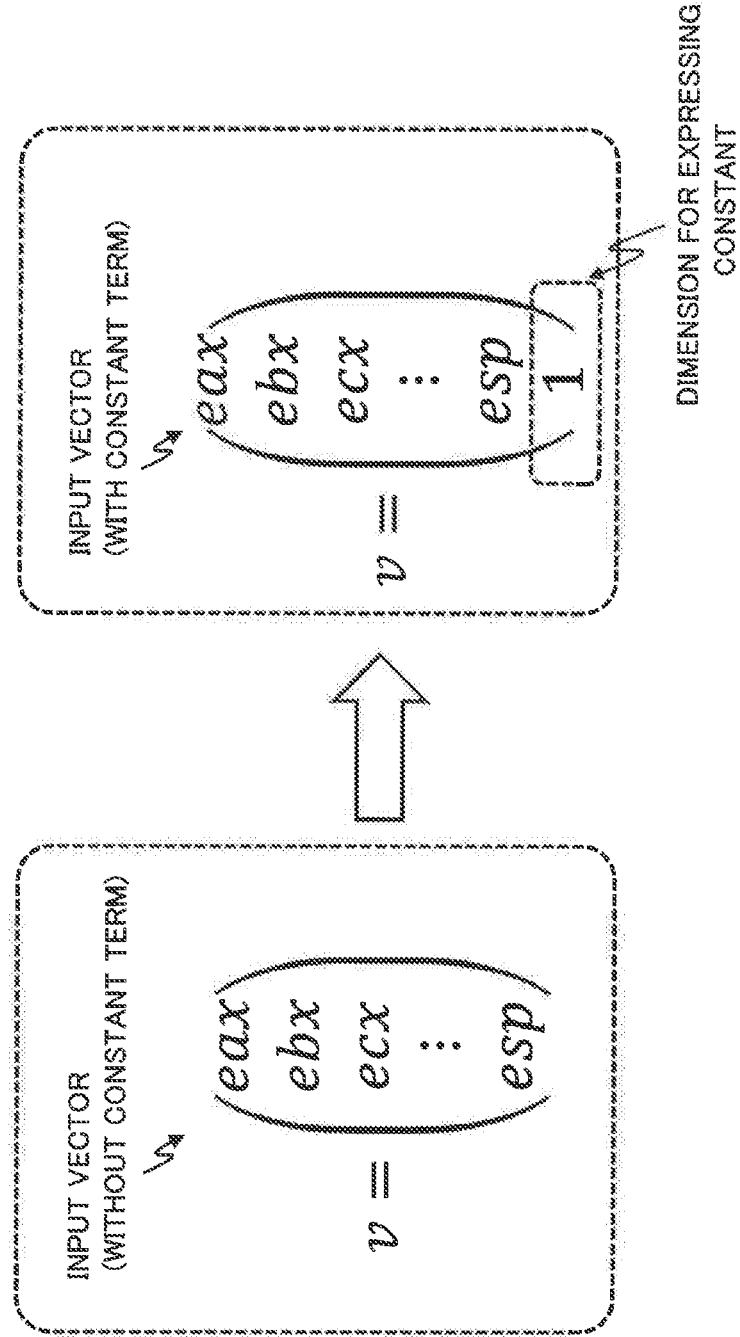
FIG. 8 is a diagram schematically illustrating a representation method of a constant term in an input vector.

An element of a variable vector may include a constant term. A constant term is an element indicating a real constant. For example, a constant term in the program analysis system 100 may be expressed as exemplified in FIG. 8, by use of a vector representation in a homogeneous coordinate system used in fields such as three-dimensional graphics. A constant term may appear only in an input vector. In a process of integrating mappings by a product operation (to be described later), for ease of implementation of a nonlinear function handling a constant as an argument, a value other than "1" may be set to a constant term.

Every element (variable) included in a variable vector may be associated with an index indicating a number of times the element is changed. As a specific example, an "n-th" (where "n" is a natural number) mapping is assumed. As indicated in the following equation, "n−1" may be associated with an index of an element in an input vector changed by an "n-th" mapping, and "n" may be associated with an index of an element in an output vector changed by the "n-th" mapping.

$$v_{in} = \begin{pmatrix} eax_{n-1} \\ ebx_{n-1} \\ ecx_{n-1} \\ \vdots \\ esp_{n-1} \end{pmatrix} \rightarrow v_{out} = \begin{pmatrix} eax_n \\ ebx_n \\ ecx_n \\ \vdots \\ esp_n \end{pmatrix}$$

For example, in a memory reference described above, an index (e.g. "2" in "$vreg_2$") of an element (address part) between brackets may differ from an index (e.g. "1" in "$[vreg_2]_{ref16,1}$") of the memory reference itself, as indicated in the following equation.

$$v_{out} = \begin{pmatrix} [vreg_1]_{ref32,1} \\ [vreg_2]_{ref16,1} \\ \vdots \\ [400000h]_{ref8,1} \end{pmatrix}$$

Transformation of an execution code into a mapping will be described below. The program analysis system 100 transforms an instruction sequence included in an execution code into one of a linear function, a nonlinear function, and an external function.

A linear function holds a transformation matrix. A product of the transformation matrix and an input vector is handled as an output vector. The linear function may be expressed by a single transformation matrix. Specifically, when an input vector with respect to a certain instruction is transformable to an output vector by use of a transformation matrix, the instruction is transformed into a linear function. A specific example of a transformation matrix will be described later.

A nonlinear function holds an identifier indicating a type of the function and information indicating processing by the function (an entity of the function). For example, a nonlinear function represents a mapping which is difficult to be represented by a simple transformation matrix. A nonlinear function does not need to include a transformation matrix. Information indicating processing by a function may be expressed by a lambda-expression. In this case, when an input vector is given as an argument with respect to a lambda-expression, an output vector is obtained. A specific example of a nonlinear function will be described later.

An external function holds an identifier indicating a type of the function. For example, an external function refers to a function, such as a system call, acting outside an environment (system) in which an execution code is executed. Specifically, for example, an external function may be a system call or a library function defined outside an execution code to be analyzed.

The program analysis system 100 may hold transformation information (e.g. dictionary data constructed by use of a table, a map, or the like) associating an instruction sequence included in an execution code with a mapping (a function representing a mapping, to be described later), or the like. For example, such transformation information may include one or more combinations of an instruction sequence and a mapping (each of the aforementioned functions) into which the instruction sequence is transformed. For example, a combination included in transformation information may be a combination of an instruction (e.g. a "mov" instruction) and a mapping (e.g. a transformation matrix representing a linear mapping) into which the instruction is transformed. A combination included in transformation information may be a combination of an instruction sequence composed of a plurality of instructions and a mapping into which the instruction sequence is transformed. The program analysis system 100 may be given proper transformation information described above depending on an architecture or the like of a computer executing an execution code to be analyzed. Without being limited to the above, the program analysis system 100 may be implemented in a state in which a correspondence relation between an instruction sequence and a mapping into which the instruction sequence is transformed is previously incorporated.

The program analysis system 100 can transform, for example, instructions exemplified in FIG. 9, out of instructions included in an execution code, into linear functions. Instructions transformed into linear functions are not limited to the instructions exemplified in FIG. 9 and may be appropriately set to the program analysis system 100. A combination of an instruction exemplified in FIG. 9 and a linear function into which the instruction is transformed may be set to the aforementioned transformation information. The above will be described below by use of specific examples.

As a specific example, transformation of an instruction sequence "mov eax ecx" into a mathematical model will be described (FIG. 10A). In this case, a real register "ecx" is substituted for (moved to) a real register "eax." Specifically, the real register "ecx" in an input vector is substituted for (moved to) the real register "eax" in an output vector. Other elements included in the output vector are not changed from the input vector. In this case, as exemplified in FIG. 10A, the instruction sequence "mov eax ecx" is transformable to a mapping using a linear function including a single transformation matrix "$T_{mov}$(eax,ecx)" exemplified in FIG. 10A.

Figure 10B:
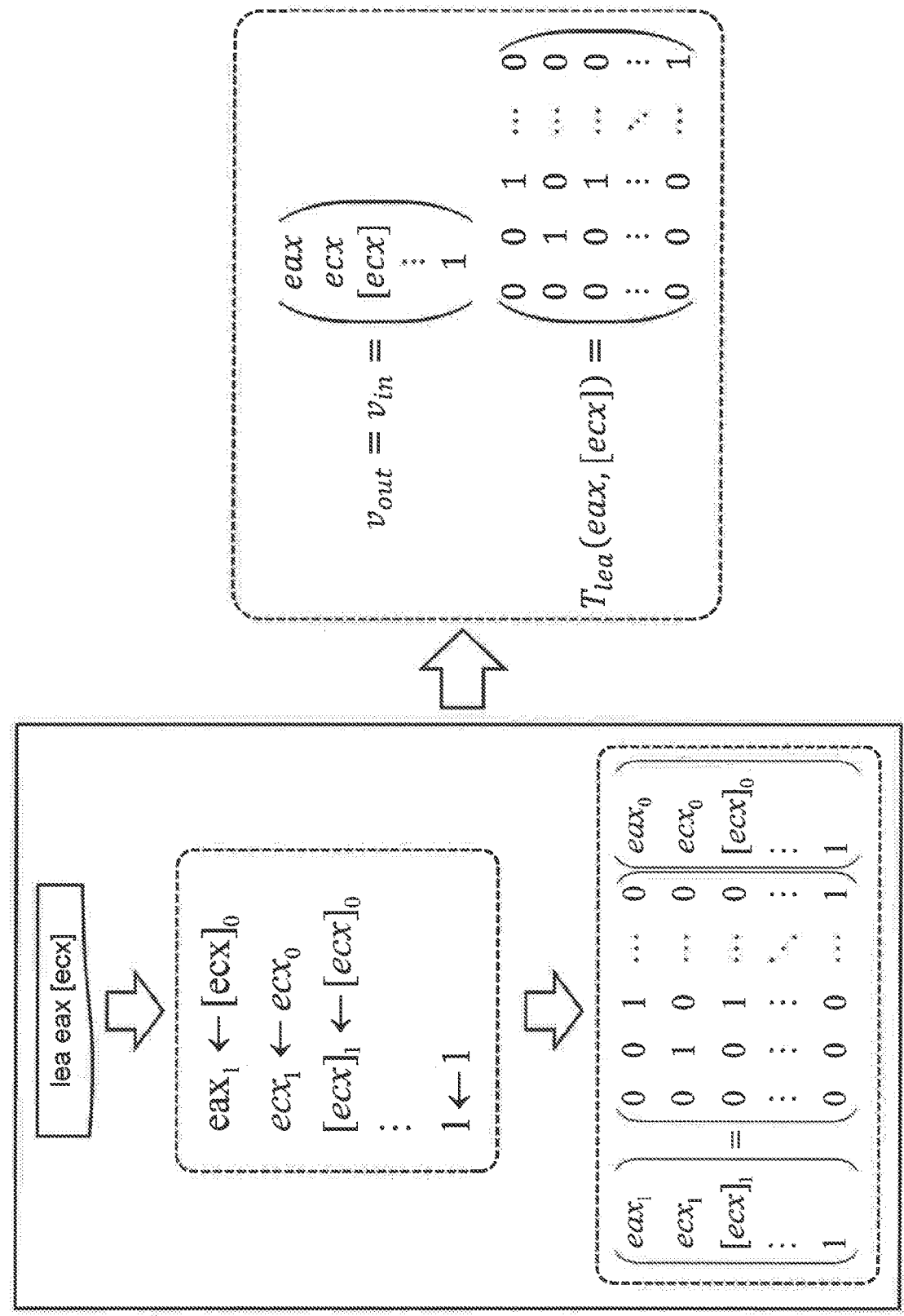
FIG. 10B is a diagram illustrating a specific example of transforming a specific instruction (a "lea" instruction) into a mapping.

As another specific example, transformation of an instruction sequence "lea eax [ecx]" into a mathematical model will be described (FIG. 10B). In this case, an address of a memory reference "[ecx]" is substituted for (moved to) a real register "eax." Specifically, the address of the memory reference "[ecx]" in an input vector is substituted for (moved to) the real register "eax" in an output vector. Other elements included in the output vector are not changed from the input vector. In this case, as exemplified in FIG. 10B, the instruction sequence "lea eax [ecx]" is transformable to a mapping using a linear function including a single transformation matrix "$T_{lea}$(eax, [ecx])."

As described above, in a transformation matrix transformed by a substitution (move) instruction, a non-zero element is set to an element of the transformation matrix on which a product operation is executed with an element of an input vector substituted for (moved to) an element of an output vector. Other elements of the transformation matrix may be set to zero ("0") elements.

Figure 10C:
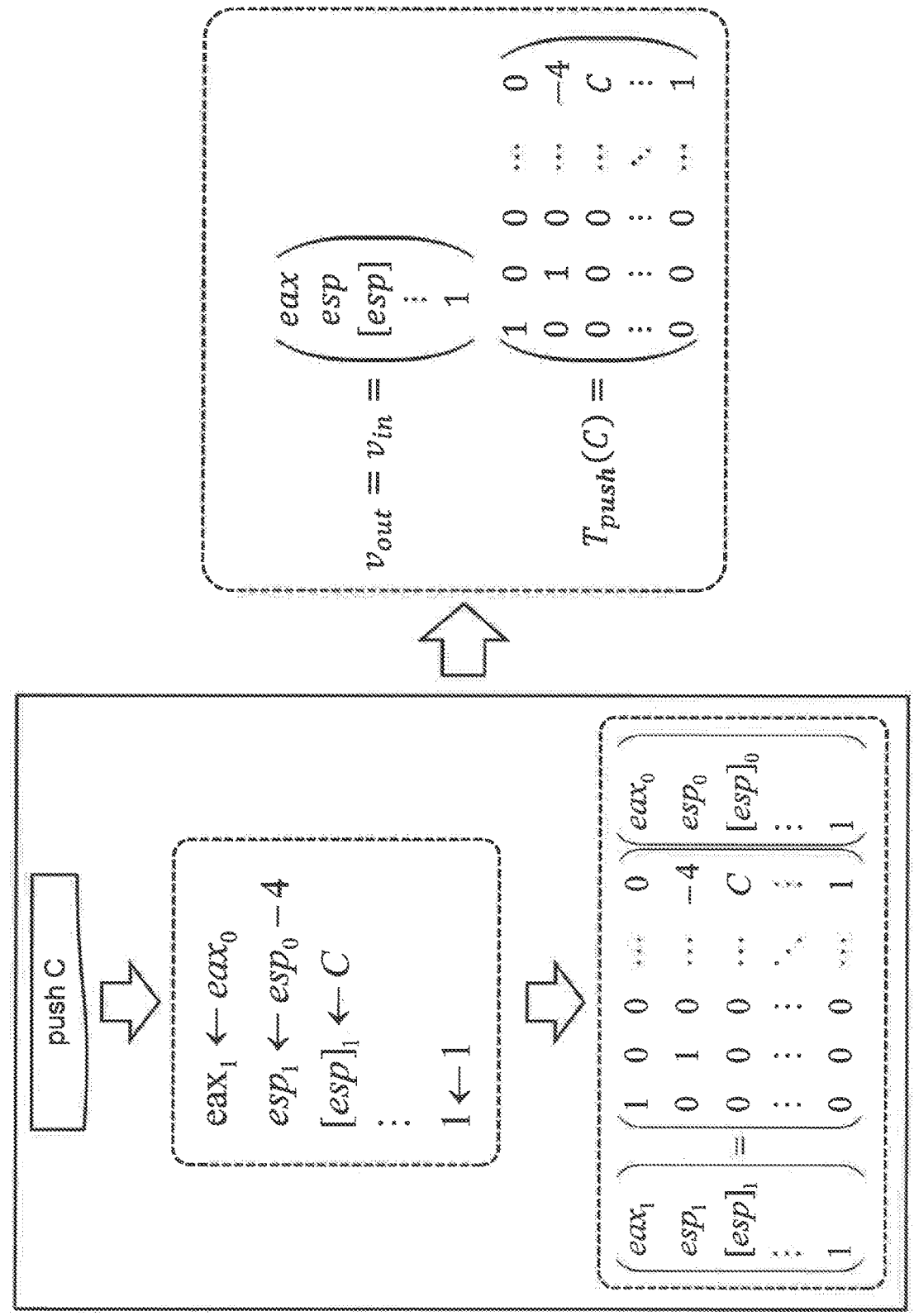
FIG. 10C is a diagram illustrating a specific example of transforming a specific instruction (a "push" instruction) into a mapping.

As another specific example, transformation of an instruction sequence "push C" (where "C" is a constant) into a mathematical model will be described (FIG. 10C). In this case, a stack pointer ("esp") is decremented (e.g. subtracted by 4 bytes), and "C" is stored at the top of the stack. Specifically, the constant C is stored in an address (the top of the stack pointed by the stack pointer) referred to by a memory reference "[esp]" in an output vector. Further, the stack pointer "esp" in the output vector is decremented from a stack pointer in an input vector. Other elements included in the output vector are not changed from the input vector. In this case, as exemplified in FIG. 10C, the instruction sequence "push C" is transformable to a mapping using a linear function including a single transformation matrix "$T_{push}$(C)."

As another specific example, transformation of an instruction sequence "pop eax" into a mathematical model will be described (FIG. 10D).

In this case, a content of an address pointed by a stack pointer "[esp]" in an input vector is stored in a real register "eax" in an output vector. Further, the stack pointer "esp" in the output vector is incremented (e.g. added by 4 bytes). In this case, as exemplified in FIG. 10D, the instruction sequence "pop eax" is transformable to a mapping using a linear function including a single transformation matrix "$T_{pop}$(eax)."

A method of transforming an instruction including a "Mod R/M" byte in the x86 architecture into a mathematical model will be described below by use of a specific example illustrated in FIG. 11. From a viewpoint of simplifying notation, elements not related to execution of instructions out of respective elements in an input vector, an output vector, and a transformation matrix are omitted in the specific example illustrated in FIG. 11. The "Mod R/M" byte is a byte being placed immediately after an operation code and specifying a register used in the operation code and an addressing mode.

Figure 11:
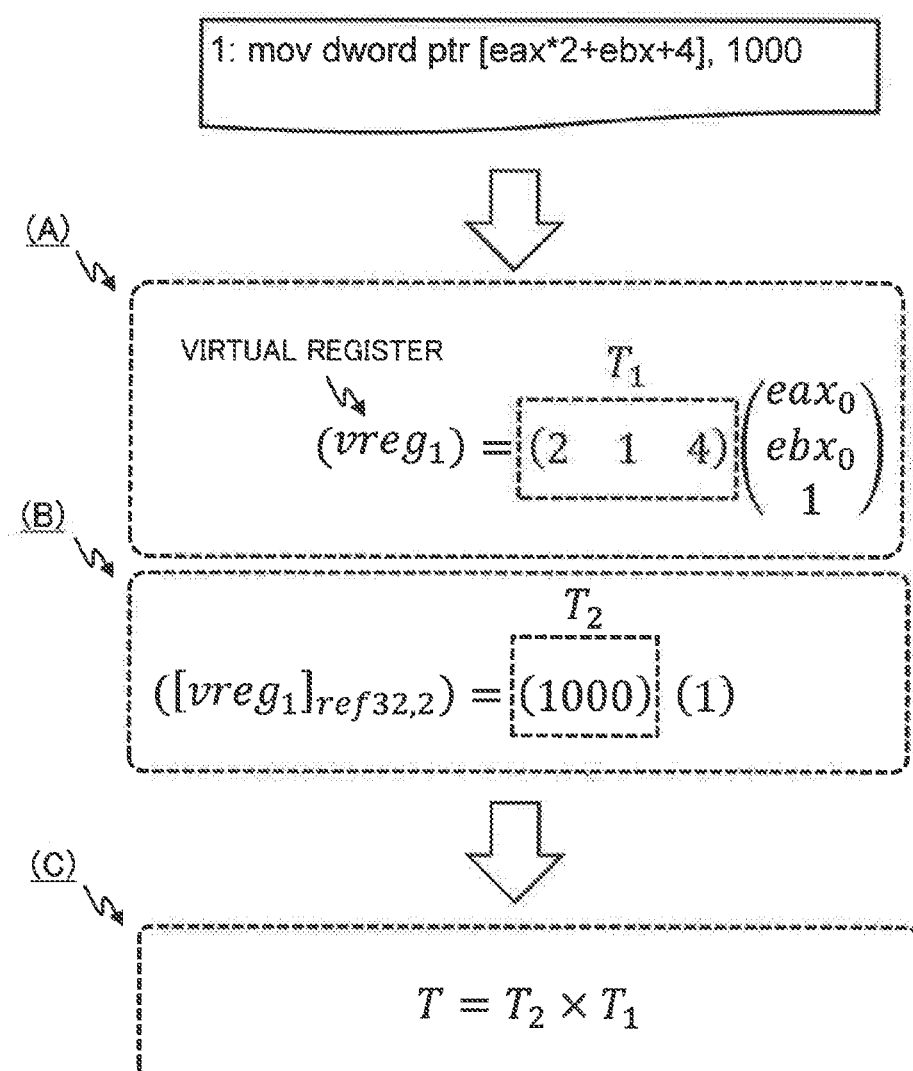
FIG. 11 is a diagram illustrating a specific example of transforming an instruction including a "Mod R/M" byte into a mapping by use of a virtual register.

The specific example illustrated in FIG. 11 is an example of transforming an instruction sequence "mov dword ptr

[eax*2+ebx+4], 1000" into a mathematical model. First, a part including "Mod R/M" (address operation) is expressed by use of a virtual register ("vreg$_1$") [(A) in FIG. 11]. Specifically, an address calculation result expressed by "[eax*2+ebx+4]" is stored in the virtual register ("vreg$_1$"). Further, "T$_1$" in FIG. 11 is a transformation matrix related to such an address calculation. A memory reference indicated by a virtual register introduced as described above is represented by a mathematical model [(B) in FIG. 11]. Specifically, an immediate value "1000" is stored in a memory area referred to by the virtual register. Further, "T$_2$" in FIG. 11 is a transformation matrix representing substitution (move) of an immediate value for (to) the memory area referred to by the virtual register. From the above, a mathematical model ("T") obtained by transforming an instruction including "Mod R/M" exemplified in FIG. 11 is expressed as a product of the two transformation matrices ("T$_1$" and "T$_2$") [(C) in FIG. 11].

With regard to an instruction other than the specific examples described above, for example, a combination of the instruction (and an instruction sequence including the instruction) and a linear function into which the instruction is transformed may be preset to the aforementioned transformation information. Consequently, for example, the program analysis system 100 can transform the instructions exemplified in FIG. 9 (and instruction sequences including the instructions) into linear functions.

For example, the program analysis system 100 according to the present example embodiment can transform instructions exemplified in FIG. 12, out of instructions included in an execution code, into nonlinear functions. A combination of an instruction exemplified in FIG. 12 and a linear function into which the instruction is transformed may be set to the aforementioned transformation information. Instructions transformed into nonlinear functions are not limited to the instructions exemplified in FIG. 12 and may be appropriately set to the program analysis system 100.

As a specific example, transformation of an instruction sequence "movzx eax, bx" [a load (move) instruction accompanied by zero extension] into a mathematical model [part (A) in FIG. 13] will be described. In this case, such an instruction is transformed into a nonlinear function accepting an input variable and a bit width as arguments. For example, a nonlinear function "Fmovzx" in (A) in FIG. 13 may be implemented as the following equation, where an input variable is denoted as "x" and a bit width as "b." In the following equation, "&" denotes a logical conjunction operation. By calculating a logical conjunction of the variable "x" and "($2^b$−1)," a zero extended value of "x" is obtained.

$$F_{movzx}(x,b) = x \& (2^b-1)$$

Figure 13:
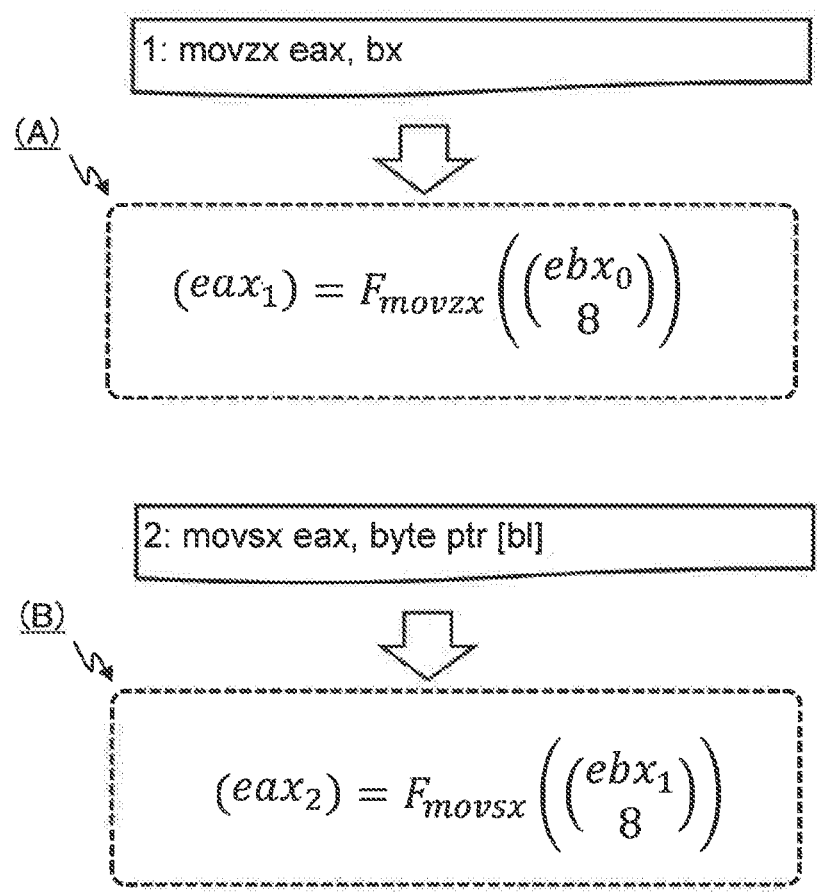
FIG. 13 is a diagram illustrating specific examples of transforming specific instructions (a "movzx" instruction and a "movsx" instruction) into nonlinear functions.

Further, similarly to the above, an instruction sequence "movsx eax, byte ptr [b1]" [a load (move) instruction accompanied by sign extension] is also transformed into a nonlinear function accepting an input variable and a bit width as arguments [part (B) in FIG. 13]. For example, a nonlinear function "Fmovsx" in (B) in FIG. 13 may be implemented as the following equation, where an input variable is denoted as "x" and a bit width as "b." In the following equation, "F$_{bt}$(x,b)" is a nonlinear function representing a "bt" instruction. By executing sign extension processing, based on a confirmation result of a sign of the variable "x," a sign extended value of "x" is obtained.

$$F_{movsx}(x,b) = F_{bt}(x,b-1) \& (x | ((2^{32}-1)*(2^b))):(x \& (2^b-1))$$

With regard to an instruction other than the specific examples described above, for example, a combination of the instruction (and an instruction sequence including the instruction) and a nonlinear function into which the instruction is transformed may be preset to the aforementioned transformation information. Consequently, for example, the program analysis system 100 can transform the instructions exemplified in FIG. 12 (and instruction sequences including the instructions) into nonlinear functions.

Integration processing of mappings by the program analysis system 100 will be described below.

Figure 14:
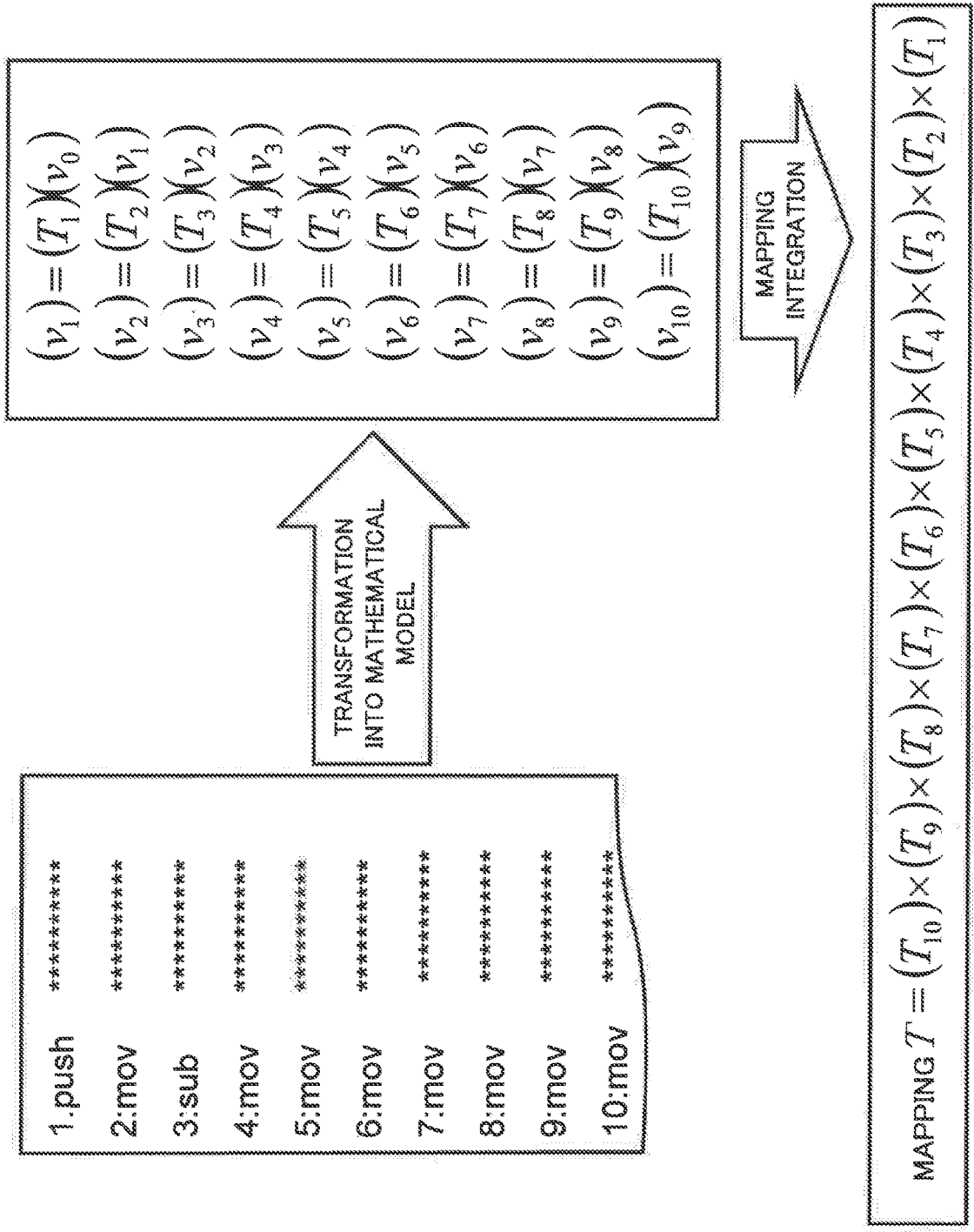
FIG. 14 is a diagram schematically illustrating a method of integrating, by a product, mappings transformed from a plurality of instruction sequences.

For example, when a plurality of instruction sequences exist as illustrated in FIG. 14 (rows 1 to 10), the program analysis system 100 transforms the respective instruction sequences into mathematical models using mappings "T$_1$" to "T$_{10}$."

The program analysis system 100 (the factor extraction unit 104, the factor search unit 108, the execution file adjustment unit 112, and the like, in particular) integrates mappings by product operation processing.

Figure 15:
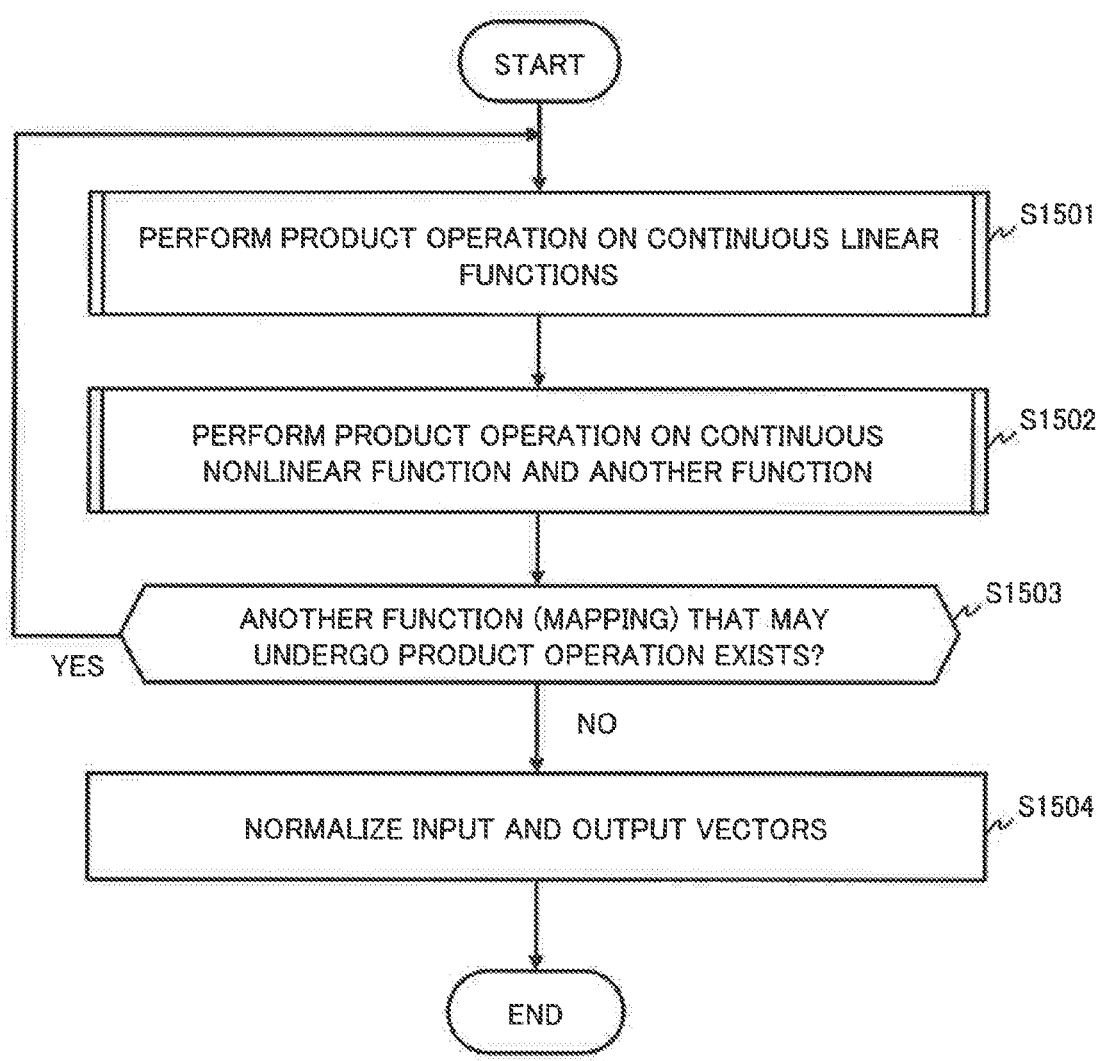
FIG. 15 is a flowchart exemplifying integration processing of mappings by a product.

Consequently, a number of mappings used in representation of instruction sequences is reduced. By such mapping integration, for example, the program analysis system 100 can represent instruction sequences with minimum mapping composition. The integration processing of mapping by a product operation will be described below with reference to a flowchart exemplified in FIG. 15. The following processing may be executed by the factor extraction unit 104, the factor search unit 108, the execution file adjustment unit 112, and the like included in the program analysis system 100.

Specifically, the program analysis system 100 performs a product operation on continuous linear functions (Step S1501). The program analysis system 100 performs a product operation on a continuous nonlinear function and another function (Step S1502). When another function that may undergo a product operation exists (YES in Step S1503), the program analysis system 100 returns to Step S1501 and continues the processing. When another function that may undergo a product operation does not exist, the program analysis system 100 normalizes input and output vectors (Step S1504).

Figure 16:
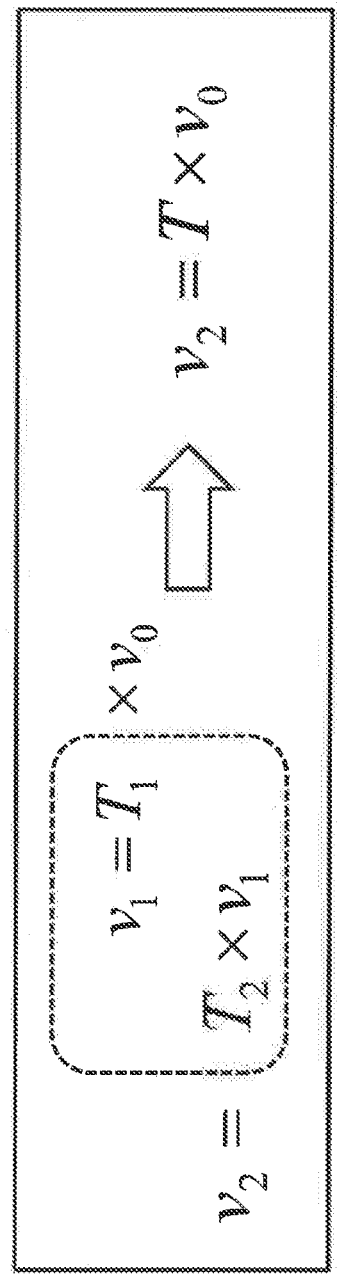
FIG. 16 is a diagram schematically illustrating calculation processing of a product of continuous linear functions.
Figure 17:
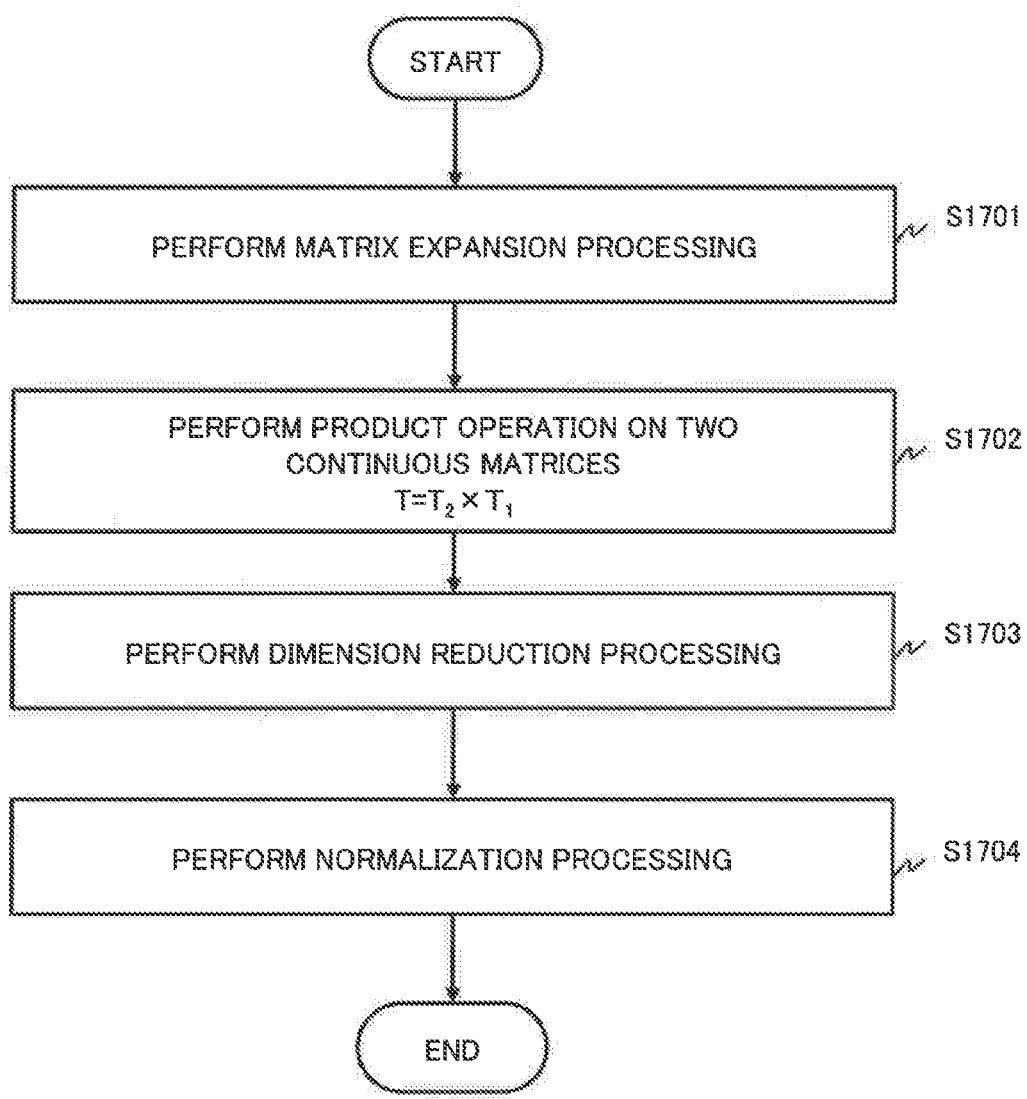
FIG. 17 is a flowchart exemplifying the calculation processing of a product of continuous linear functions.

The processing in Step S1501 will be described below with reference to FIGS. 16 to 19. As schematically illustrated in FIG. 16, when two linear functions ("T$_1$" and "T$_2$") are continuous, the program analysis system 100 performs a product operation on the functions. Consequently, the program analysis system 100 integrates the two mappings into one mapping "T."

A variable vector "v$_1$" is an output vector of the linear function "T$_1$" and is an input vector of the linear function "T$_2$." Accordingly, the program analysis system 100 adjusts the variable vector "v$_1$" in such a way that types and positions of elements respectively included in the output vector of the linear function "T$_1$" and the input vector of the linear function "T$_2$" match. Further, the program analysis system 100 expands dimensions of the linear functions "T$_1$" and "T$_2$," and variable vectors "v$_0$" and "v$_2$" in such a way as to adapt to the variable vector "v$_1$." Specifically, the program analysis system 100 expands rows and columns of the linear functions ("T$_1$" and "T$_2$") in such a way as to adapt to types and positions of variables (elements) included in the variable vector "v$_1$." Similarly, the program analysis system 100 expands rows of the variable vectors "v$_0$" and "v$_2$." The processing described above by the program analysis system 100 may be hereinafter referred to as matrix expansion processing (Step S1701).

The program analysis system 100 attaches (associates) an index to (with) each element (variable) in an input vector and an output vector. In an execution code, "n" is attached as an index to an element included in an output vector of a mathematical model transformed from an instruction sequence in an "n-th" row (where "n" is a natural number). Further, "n−1" is attached as an index to an element included in an input vector of a mathematical model transformed from the instruction sequence in the "n-th" row (where "n" is a natural number). With regard to an address part (a part enclosed by brackets "[" and "]") of a memory reference, an address part of an input vector and an address part of an output part may be the same (including an index). The processing described above may be referred to as variable index attachment processing. In the variable index attachment processing, for example, the program analysis system 100 may associate data indicating an index, as additional data, with data indicating each element in an input vector and an output vector. As a specific method of associating additional data with certain data, for example, a proper method such as a method using a table, a structure, or a pointer may be selected.

The program analysis system 100 may include a set of an element (variable) included in an output vector of a mathematical model transformed from a certain instruction and an index of the element, in an output vector of a mathematical model transformed from an instruction after the certain instruction. For example, when an element "$a_i$" (a set of a variable "a" and an index "i" of the variable, where "i" is a natural number) is included in an output vector "$v_i$" of a mathematical model transformed from an "i-th" instruction, the program analysis system 100 may include the element (variable) "$a_i$" in an output vector of a mathematical model transformed from an "(i+1)-th" instruction or later. The processing described above may be hereinafter referred to as "variable propagation processing."

Figure 18:
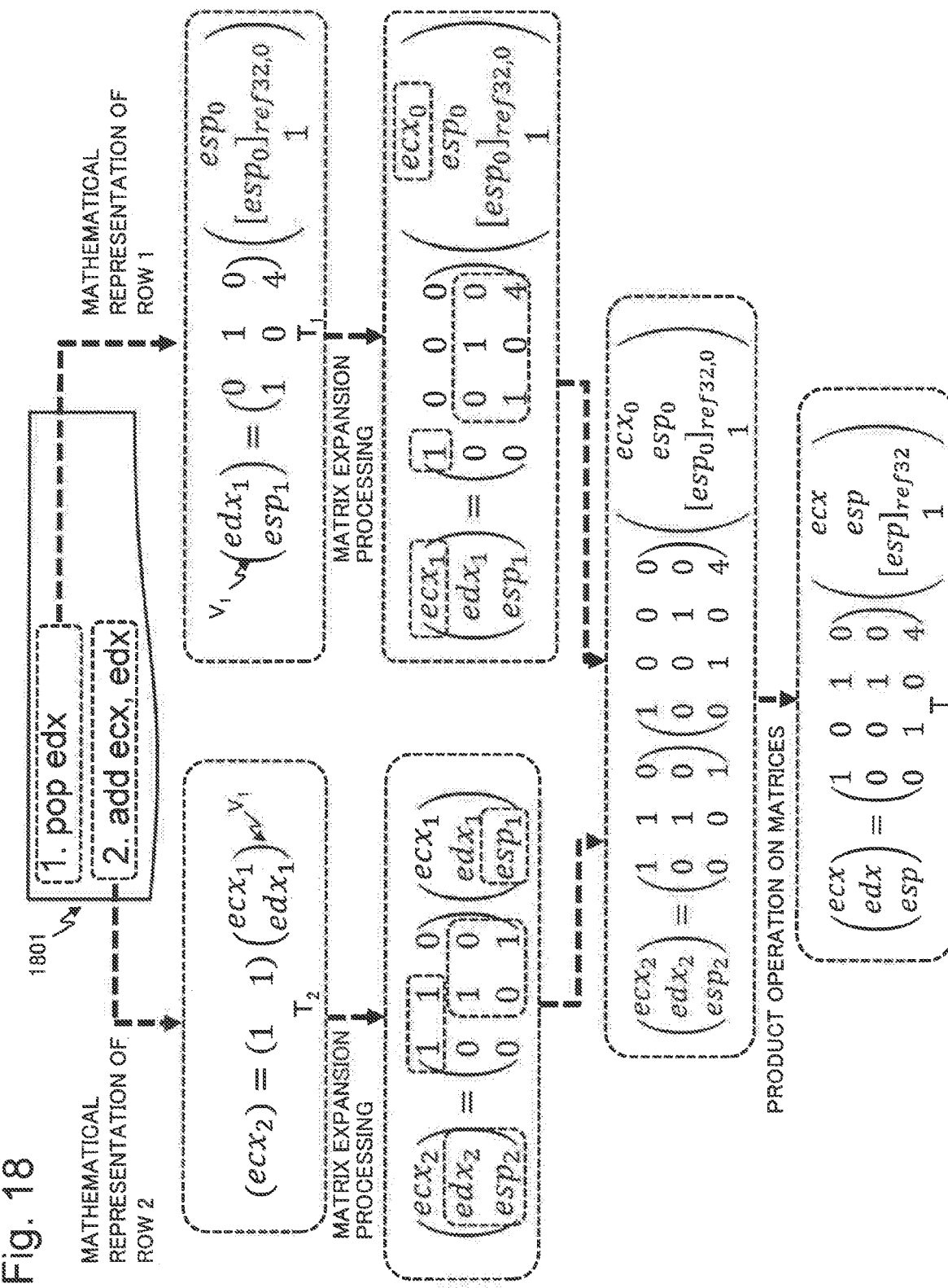
FIG. 18 is a diagram exemplifying integration of mappings (linear functions) transformed from consecutive instruction sequences.

Describing the above by use of a specific example illustrated in FIG. 18, an output vector of the first row ("pop edx") of an instruction sequence 1801 includes elements "edx" and "esp," and an input vector of the second row ("add ecx edx") of the instruction sequence 1801 includes elements "ecx" and "edx." Consequently, the program analysis system 100 adjusts a variable vector "$v_1$" in such a way that the vector includes the elements "ecx," "edx," and "esp." The program analysis system 100 expands rows and columns of mathematical models (transformation matrices) "$T_1$" and "$T_2$" transformed from the respective instruction sequences in such a way as to adapt to types and positions of elements included in the variable vector "$v_1$." The program analysis system 100 attaches indices to input vectors and output vectors of the mathematical models (transformation matrices) "$T_1$" and "$T_2$."

The program analysis system 100 performs a product operation on the mathematical models (transformation matrices) "$T_1$" and "$T_2$" transformed from the respective instruction sequences (Step S1702). In the specific example illustrated in FIG. 18, "$T_1$" and "$T_2$" are integrated by such product operation processing, and the two instruction sequences are represented by one transformation matrix "T."

The program analysis system 100 executes dimension reduction processing being processing of reducing a dimension of the transformation matrix integrated in Step S1702 (Step S1703). For example, such dimension reduction processing may include processing of reducing columns of the transformation matrix "T" by reducing a dimension of an input vector "$v_0$." Further, such dimension reduction processing may include processing of reducing rows of the transformation matrix "T" by reducing a dimension of an output vector "$v_2$."

For example, the program analysis system 100 may reduce a variable attached with a different index, out of elements (variables) included in an output vector. Specifically, the program analysis system 100 may execute each of the following types of processing. When a variable included in an output vector is a real register or a memory reference, and the same variable with a different index does not exist, the program analysis system 100 may determine that a set of the variable and the index is in a final state. In this case, the program analysis system 100 may end processing related to such a variable. When a set of a variable and an index of the variable, the set being included in the output vector, is not in a final state, and does not have a relation with another variable (e.g. a memory reference), the program analysis system 100 deletes the set of the variable and the index.

The program analysis system 100 executes the following variable normalization processing and state normalization processing (Step S1704). The variable normalization processing is processing of extracting a variable determined to be a constant and moving the variable to a constant term. Based on an order of priority of variables (e.g. FIG. 20), the program analysis system 100 reduces types of variables appearing in a variable vector. The state normalization processing is processing of expressing every memory reference included in an output vector by a variable in a final state. The program analysis system 100 may repeat the processing in Steps S1703 and S1704 until the output vector no longer changes.

The above will be described by use of a specific example illustrated in FIG. 19. In the specific example illustrated in FIG. 19, the program analysis system 100 transforms each instruction sequence included in an execution code (1901 in FIG. 19) into a mathematical model (1902 in FIG. 19). The program analysis system 100 executes the matrix expansion processing (Step S1701) and the product operation processing (Step S1702) that are described above and acquires an integrated transformation matrix, and an input vector and an output vector of the matrix (1903 in FIG. 19).

A variable "$eax_3$" included in the output vector depends on "$eax_1$." Further, the variable "$eax_1$" included in the output vector depends on a constant "1000." Accordingly, the variable "$eax_3$" is expressed by a constant. Since "$eax_1$" being a variable in the input vector is determined to be a constant ("1000"), a dimension of the input vector is reduced by normalizing variables in the input vector. Consequently, columns of the transformation matrix are reduced (1904 in FIG. 19).

Figure 19:
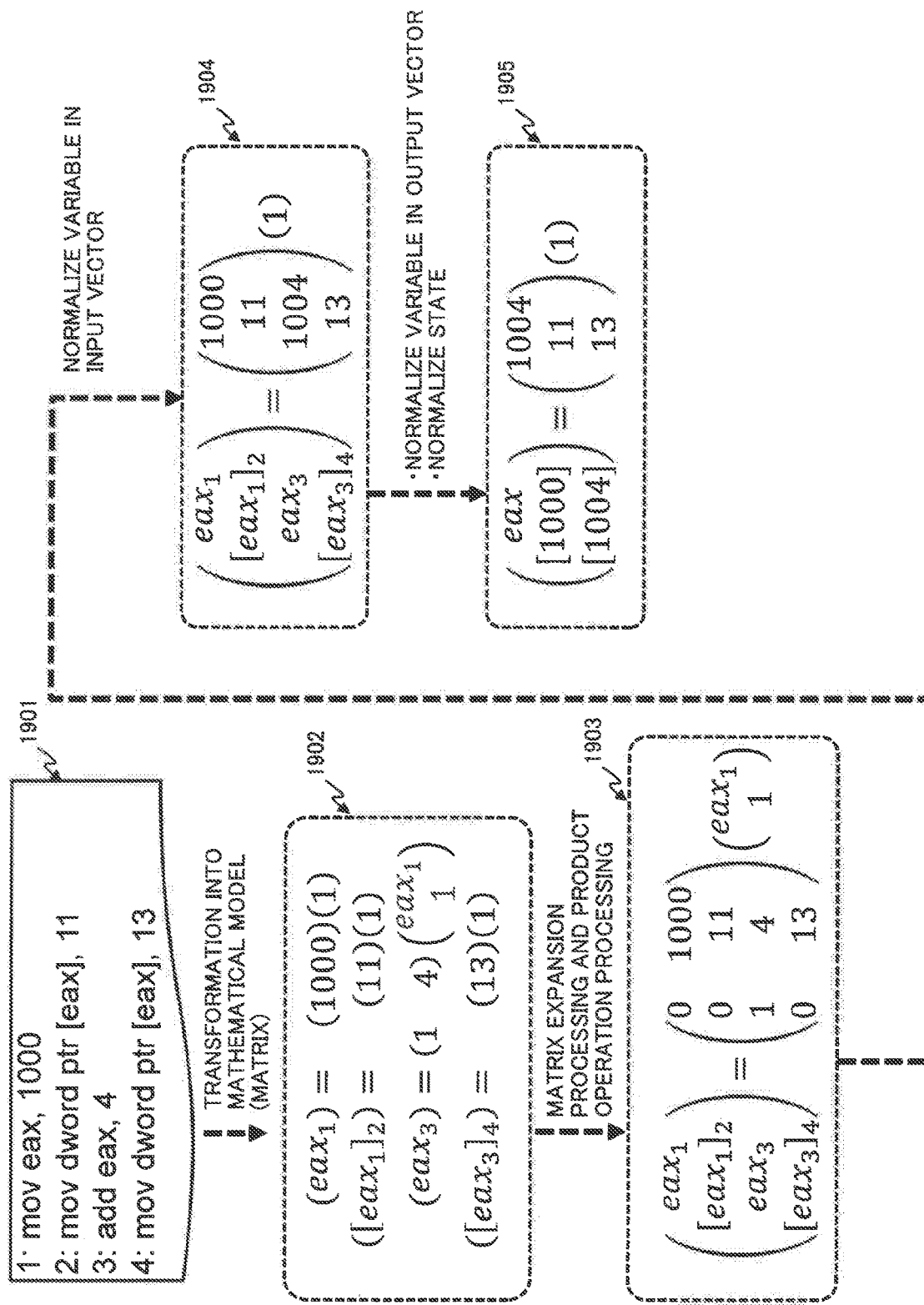
FIG. 19 is a diagram exemplifying integration of mappings (linear functions) transformed from consecutive instruction sequences.

Since "$eax_3$" being a variable in the input vector is expressed by a constant ("1004"), rows of the transformation matrix are reduced by execution of output vector normalization and state normalization (1905 in FIG. 19).

A product operation including a nonlinear function (Step S1502 in FIG. 15) will be described below.

It is assumed as an example that, in a mathematical model "$T=T_2 \times T_1$" representing a composite mapping, a mathematical model "$T_2$" is a nonlinear function, and a mathematical model "$T_1$" is a linear function. When a logical conjunction of a set of constants included in an output vector of the linear function "$T_1$" and a set of variables included in an input vector of the nonlinear function "$T_2$" is not empty, the nonlinear function "$T_2$" may be transformed into another linear function. In this case, the program analysis system 100 may transform the nonlinear function "$T_2$" into a linear function and then execute a product operation on the aforementioned linear functions. When the nonlinear function "$T_2$" cannot be transformed into a linear function, the program analysis system 100 may apply the linear function "$T_1$" to the input vector and apply the nonlinear function "$T_2$" to the result.

It is assumed as a specific example that "$T_1$" is a linear function transformed from a data substitution (move) instruction [e.g. "mov ebx C" (where C is a constant)], and "$T_2$" is a nonlinear function transformed from a multiplication instruction (e.g. "mul ebx"). In this case, a composite mapping "T" is expressed as "T=mul ° mov" (where symbol "°" denotes composite mapping). It is further assumed that, when a "mul" instruction is executed, multiplication of a value stored in a register "eax" and an operand given to the "mul" instruction is performed, and a higher-order part of the multiplication result is stored in a register "edx," and a lower-order part is stored in the register "eax." For example, such an instruction sequence is expressed by a pseudo-code as follows.

edx: eax←eax*ebx

For example, when "ebx=1" holds [e.g. when an instruction such as "mov ebx n" is executed (where n is a constant)], execution of a "mul ebx" instruction does not change a value of "eax." Further, when "ebx=0," "0" is stored in "eax" by execution of the "mul ebx" instruction. In either case, "0" is stored in "edx." For example, the above is expressed by pseudo-codes as follows.

if edx=1 then edx←0, eax←eax
    if edx=0 then edx←0, eax←0

In the case described above, a constant ("ebx=0" and "ebx=1" in this case) is included in an output vector of a linear function transformed from the "mov" instruction. In other words, a constant set in this case is "ebx." Further, "ebx" and "eax" are included in an input vector of a nonlinear function transformed from the "mul" instruction (i.e. "ebx" and "eax" are included in a variable set in the input vector). Accordingly, "ebx" is included in the constant set ("ebx" in this case) included in the output vector of the linear function and the variable set ("eax" and "ebx" in this case) included in the input vector of the nonlinear function. In this case, the nonlinear function transformed from the "mul" instruction is transformable to a linear function. When "ebx=0" or "ebx=1" does not hold, the nonlinear function transformed from the "mul" instruction is not transformed into a linear function.

It is assumed as another example that, in a mathematical model "$T=T_2 \times T_1$" representing a composite mapping, both of mathematical models "$T_1$" and "$T_2$" are nonlinear functions. In this case, by the definition of an inverse morphism, when one mapping is a (partial) inverse mapping of the other, the mappings are transformable to an identity mapping.

It is assumed as a specific example that "$T_1$" is a nonlinear function transformed from a multiplication instruction (e.g. "mul ebx"), and "$T_2$" is a nonlinear function transformed from a division instruction (e.g. "div ebx"). In this case, a composite mapping "T" is expressed as "T=div° mul" (where symbol "°" denotes composite mapping). For example, such an instruction sequence is expressed by pseudo-codes as follows.

edx: eax←eax*ebx
    eax←edx: eax/ebx, edx←edx: eax mod ebx

When ebx is not "0" (zero), a value of "eax" does not change. The reason is that multiplication and subsequent division by the same value ("ebx") are performed. Further, "0" is set to "edx." For example, the above is expressed by a pseudo-code as follows.

if ebx≠0 then eax←eax, edx←0

From the above, when one mapping is an inverse mapping of the other with regard to the mathematical models "$T_1$" and "$T_2$," the mapping "T" obtained by compositing the models corresponds to processing of further inverse-mapping a mapping result of the input vector and therefore is considered to be an identity mapping. In the aforementioned specific example, since the "div" instruction is an inverse mapping of the "mul" instruction, the mapping "T=div° mul" may be handled as an identity mapping. For example, the program analysis system 100 may handle an identity mapping as a mapping corresponding to a "nop" instruction and does not need to execute processing related to the mapping. When the mathematical models "$T_1$" and "$T_2$" cannot be handled as an identity mapping, the program analysis system 100 may apply the nonlinear function "$T_1$" to the input vector and apply the nonlinear function "$T_2$" to the result.

Normalization of input and output vectors (Step S1504 in FIG. 15) will be described below. The program analysis system 100 rearranges an order of rows of an input vector, based on an order of priority of elements (variables) included in the input vector. The program analysis system 100 rearranges an order of rows of an output vector, based on an order of priority of elements (variables) included in the output vector. For example, the order of priority of variables may be predetermined as exemplified in FIG. 20. The order of priority illustrated in FIG. 20 is a specific example, and an order of priority of variables may be appropriately determined.

Figure 21:
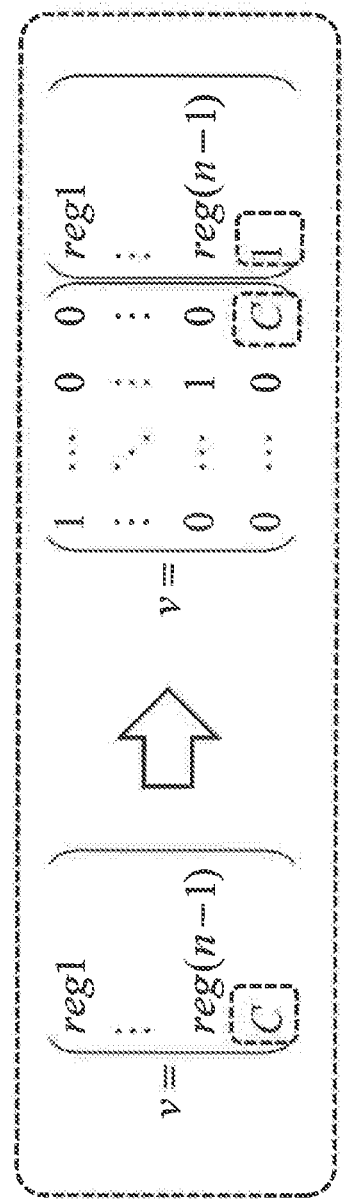
FIG. 21 is a diagram exemplifying normalization of a constant term with respect to an input vector.

Further, for example, the program analysis system 100 adjusts an input vector in such a way that a constant term in the input vector becomes "1," as exemplified in FIG. 21.

By the processing described above, the program analysis system 100 can transform an instruction sequence in an execution code into a mathematical model. As described above, a mathematical model transformed from an execution code corresponds to an abstract code. By executing mapping composition processing, the program analysis system 100 can transform an execution code composed of a plurality of rows into one or more abstract codes.

[Operation]

An operation of the program analysis system 100 according to the present example embodiment will be described below with reference to respective flowcharts exemplified in FIGS. 2, 3, 4, and 5.

Figure 2:
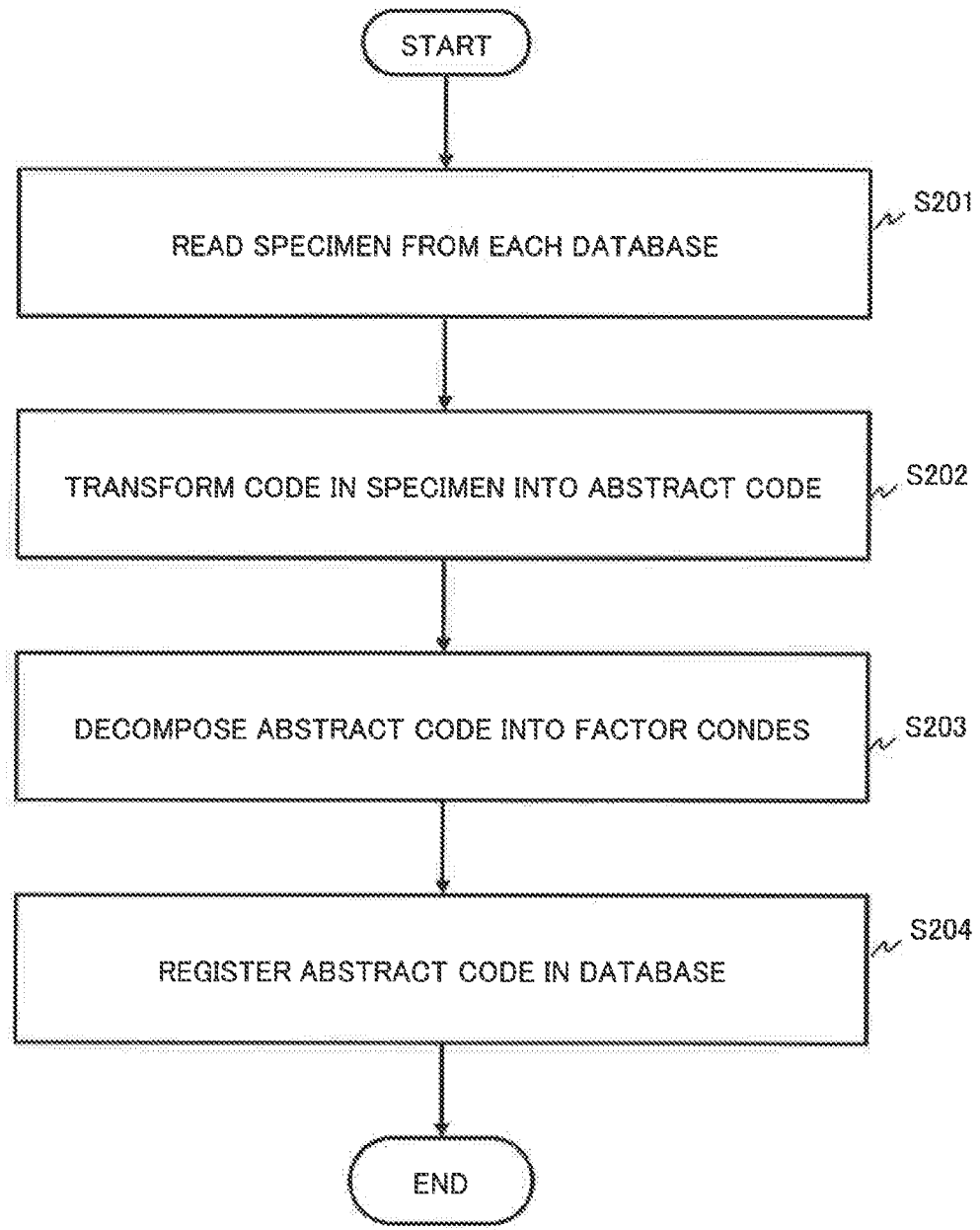
FIG. 2 is a flowchart illustrating an operation example of a factor extraction unit included in the program analysis system according to the first example embodiment of the present disclosure.

FIG. 2 is a flowchart illustrating a specific example of an operation of the factor extraction unit 104. For example, processing exemplified in FIG. 2 may be executed at a predetermined timing (e.g. at every predetermined time).

The factor extraction unit 104 reads a specimen (an execution code of a specimen) from each of the vulnerability database 101, the malware database 102, and the system database 103 (Step S201).

The factor extraction unit 104 transforms an execution code (e.g. a machine language code) included in a specimen into an abstract code (Step S202). At this time, for example, the factor extraction unit 104 may analyze the execution code included in the execution code in the specimen by use of a static analysis technique such as disassembly. For example, the factor extraction unit 104 may hold the transformation information (e.g. a transformation table or a transformation map) described above associating an analysis result of an execution code (e.g. an assembler code) with an abstract code, and by use of the transformation information, transform the execution code into an abstract code. As described above, an abstract code is composed of an input vector and an output vector represented by abstracted variable names, and a function representing a mapping between the vectors. An abstract code transformed from a specimen included in each of the aforementioned databases by the factor extraction unit 104 may be hereinafter referred to as a "known abstract code."

For example, the factor extraction unit 104 may transform an execution code into data expressed by use of a specific intermediate form (intermediate data) and further transform the transformed data into an abstract code. For example, the factor extraction unit 104 may transform an execution code into intermediate data in a static single assignment form (SSA form). In this case, the aforementioned transformation information may include a combination of an instruction sequence included in an execution code and intermediate data transformed from the instruction sequence, and a combination of intermediate data and a mathematical model transformed from the intermediate data.

The factor extraction unit 104 may execute the mapping integration processing described above on a mathematical model transformed from an execution code.

The factor extraction unit 104 decomposes the abstract code into indivisible (relatively prime) factor codes (Step S203). The factor code refers to data expressing an execution code transformed into a mathematical model. When a dependence between a factor code and another factor code in which a variable in an output vector is included in common does not exist, the factor codes are relatively prime factor codes. For example, a factor code is a mathematical model representing an operation on one or two variables. For example, an abstract code may be represented by a set of factor codes.

The factor extraction unit 104 decomposes an abstract code into factor codes by decomposing a matrix representing the abstract code by use of some technique. For example, the factor extraction unit 104 may decompose an abstract code into factor codes by use of a decomposition result of a matrix representing the abstract code by use of a well-known matrix decomposition technique [e.g. LU decomposition, singular value decomposition (SVD), or principal component decomposition] or the like. The method of decomposing a matrix representing an abstract code is not limited to the above. For example, when each row in a product operation result of a matrix representing an abstract code and some vector is relatively prime, the respective rows may be handled as factor codes.

The factor extraction unit 104 registers in the factor database 105 factor codes, an order of the codes, and addresses of the codes on a virtual memory (Step S204). The factor extraction unit 104 may register in the factor database 105 not only factor codes but also abstract codes.

Figure 3:
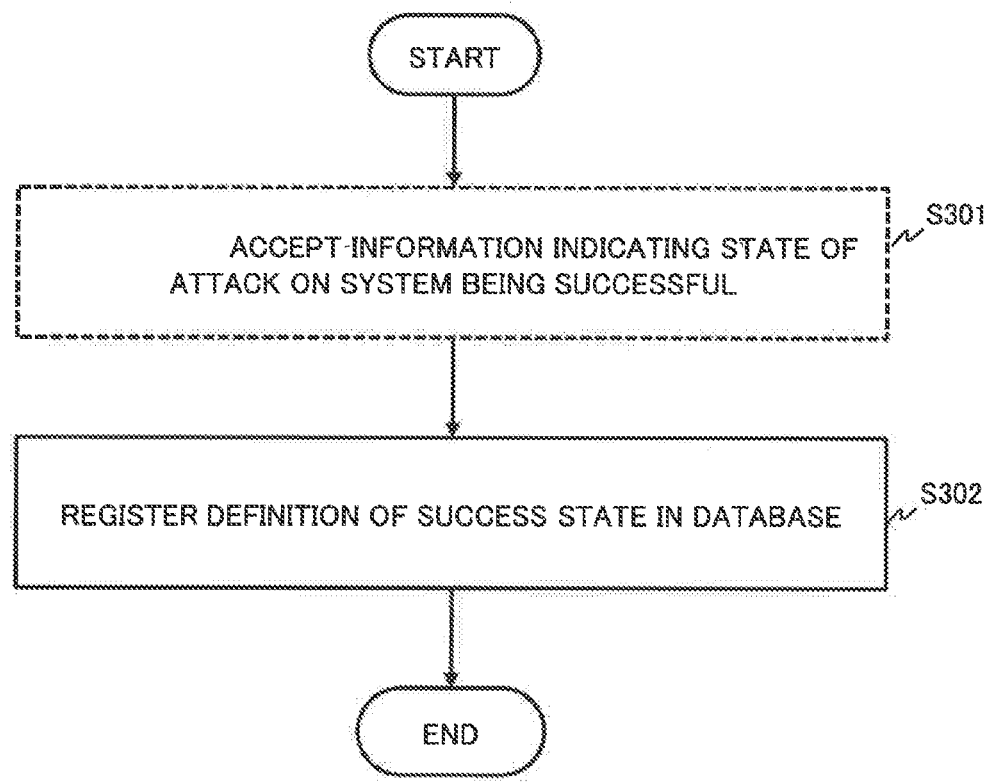
FIG. 3 is a flowchart illustrating an operation example of a success state providing unit included in the program analysis system according to the first example embodiment of the present disclosure.

FIG. 3 is a flowchart illustrating a specific example of an operation of the success state registration unit 106. For example, the success state registration unit 106 may start processing in response to a request from a user of the program analysis system 100.

The success state registration unit 106 accepts from a user of the program analysis system 100 information indicating a state of an attack related to a system or a device (e.g. a computer or an infrastructure) to be protected being successful (a success state) (Step S301). For example, a state of an attack related to a system being successful corresponds to a state of being deprived of control related to the system by an attacker. For example, information indicating a state of an attack being successful may be information indicating a state of a specific variable, a memory area, a file, or the like. For example, the success state registration unit may accept from a user information (data) indicating a mathematical model representation representing a state of an attack being successful. For example, the success state registration unit 106 may provide a user with an interface or the like for generating a mathematical model representing a state of an attack being successful.

The success state registration unit 106 registers in the success state database 107 information indicating a state of an attack being successful, the information being provided by a user (Step S302).

Figure 4:
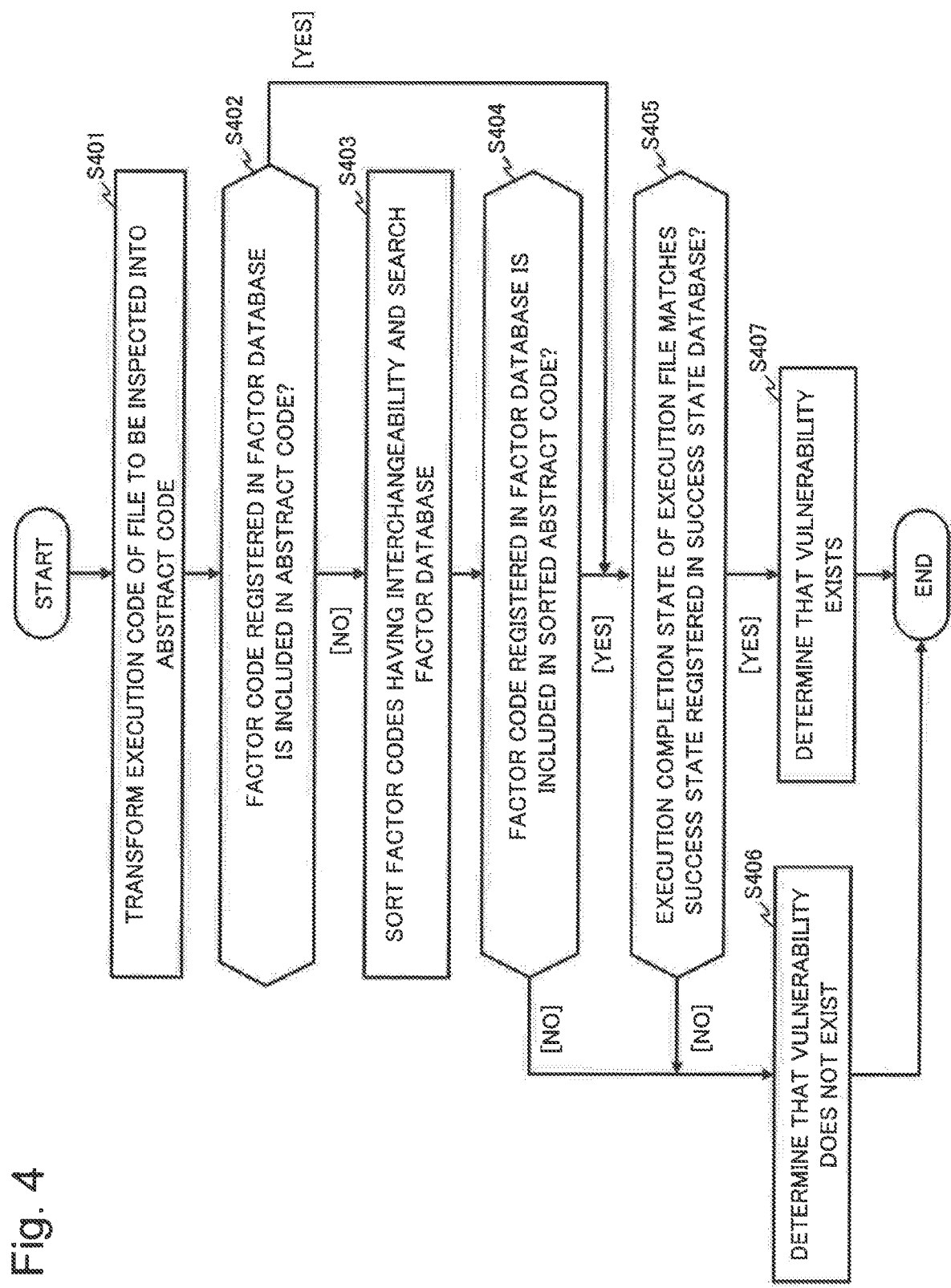
FIG. 4 is a flowchart illustrating an operation example of a factor search unit included in the program analysis system according to the first example embodiment of the present disclosure.

FIG. 4 is a flowchart illustrating a specific example of an operation of the factor search unit 108. For example, the factor search unit 108 may start processing in response to a request from a user of the program analysis system 100.

The factor search unit 108 transforms an execution code (e.g. a machine language code) of an execution file 111 to be inspected into an abstract code (Step S401). For example, the execution file 111 may be an unknown execution file not registered in any one of the vulnerability database 101, the malware database 102, and the system database 103.

Similarly to the aforementioned factor extraction unit 104, the factor search unit 108 may hold transformation information (e.g. a transformation table or a transformation map) associating an instruction included in an execution code with an abstract code (mathematical model) and transform an execution code into an abstract code by use of the transformation information. For example, an instruction sequence included in an execution code and a mathematical model (e.g. a linear function, a nonlinear function, or an external function) transformed from the instruction sequence, the two being associated with one another, may be set to such transformation information.

The factor search unit 108 confirms whether or not the abstract code transformed in Step S401 from the execution code of the execution file 111 to be inspected includes a factor code registered in the factor database 105 (known factor code) (Step S402). For example, the factor search unit 108 may decompose the abstract code transformed in Step S401 into factor codes (may be referred to as "analysis-target factor codes"). The factor search unit 108 may search the factor database 105 and confirm whether or not a factor code (known factor code) corresponding to a decomposed factor code (analysis-target factor code) is registered in the factor database 105. At this time, the factor search unit 108 may search factor codes extracted from specimens registered in the vulnerability database 101 and the malware database 102, out of factor codes (known factor codes) registered in the factor database 105.

When a factor code registered in the factor database 105 is not included in the abstract code transformed from the execution file 111 (NO in Step S402), the factor search unit 108 confirms whether factor codes having interchangeability are included in such an abstract code. Factor codes having interchangeability refers to factor codes, out of factor codes included in an abstract code, giving an equivalent execution result before and after rearranging positions or an execution order of the codes. For example, when an output vector of an abstract code does not change after rearranging one or more factor codes included in the abstract code, the factor search unit 108 may determine the one or more factor codes to be factor codes having interchangeability.

When the abstract code transformed from the execution file 111 includes factor codes having interchangeability, the factor search unit 108 partially rearranges factor codes in the abstract code. Then, the factor search unit 108 confirms whether or not the abstract code after rearranging the factor codes includes a factor code registered in the factor database 105 (Step S403).

When a factor code registered in the factor database 105 is not included in the abstract code rearranged in Step S403 (NO in Step S404), the factor search unit 108 may determine that a vulnerability related to the execution file 111 does not exist (Step S406) and end the processing.

When a factor code registered in the factor database 105 is included in the abstract code rearranged in Step S403 (YES in Step S404), the factor search unit 108 executes processing from Step S405. Further, the factor search unit 108 executes the processing from Step S405 also in a case of YES in Step S402.

In Step S405, the factor search unit 108 determines whether or not a final operation state being a final operation state of the execution file 111 is included in information indicating a success state registered in the success state database 107 (Step S405). For example, the final operation state may indicate, as a state at the end of execution of the execution file 111, a state of an output vector after execution of a mapping in the abstract code transformed from the execution file 111 (more specifically, an element included in the output vector).

When the final operation state matches a success state (or when the final operation state includes a success state) (YES in Step S405), the factor search unit 108 determines that a vulnerability related to the execution file 111 exists (Step S407). In this case, the factor search unit 108 may determine that an attack code is included in the execution file 111. In a case of NO in Step S405, the factor search unit 108 determines that a vulnerability related to the execution file 111 does not exist (Step S406). In this case, the factor search unit 108 may determine that an attack code is not included in the execution file 111. The factor search unit 108 may provide the aforementioned determination result for the determination result providing unit 109.

Figure 5:
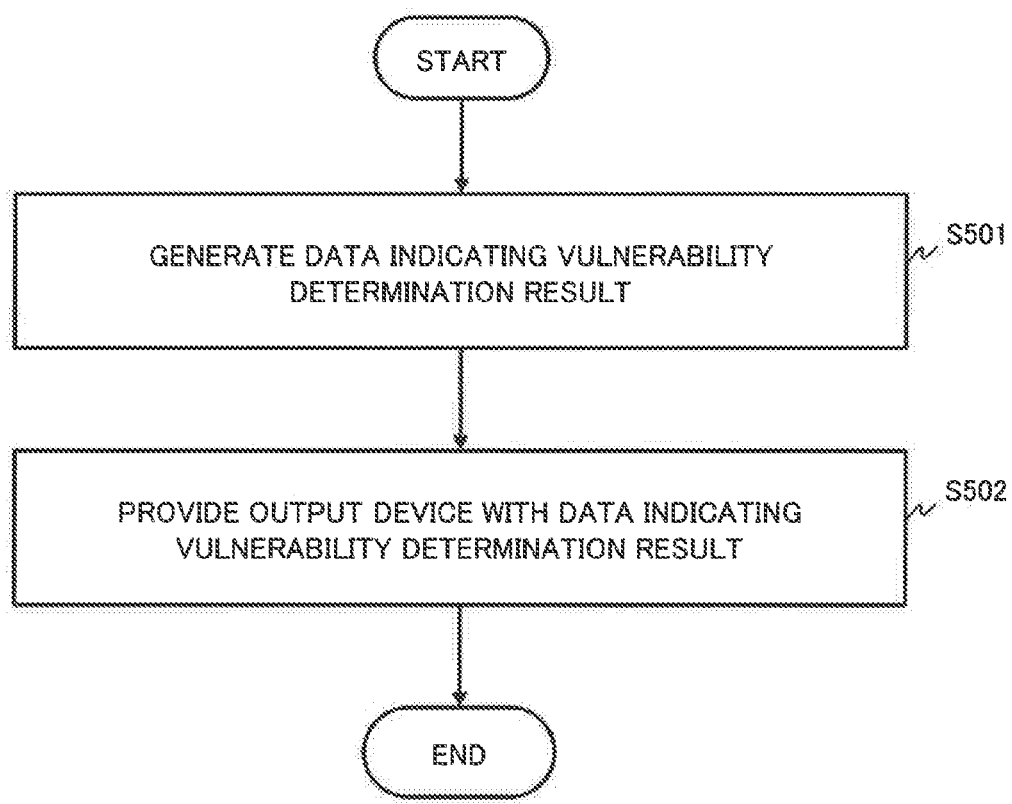
FIG. 5 is a flowchart illustrating an operation example of a determination result providing unit included in the program analysis system according to the first example embodiment of the present disclosure.

FIG. 5 is a flowchart illustrating an operation example of the determination result providing unit 109. The determination result providing unit 109 confirms existence or nonexistence of a vulnerability related to an execution file 111 from a determination result in the factor search unit 108 and generates information (data) indicating the determination result (Step S501). The determination result providing unit 109 may generate data representing such information by use of a character or a diagram.

The determination result providing unit 109 provides the generated data for the output device 110 (Step S502).

Processing in a case that the program analysis system 100 includes the execution file adjustment unit 112 will be described below as a modified example.

Figure 6:
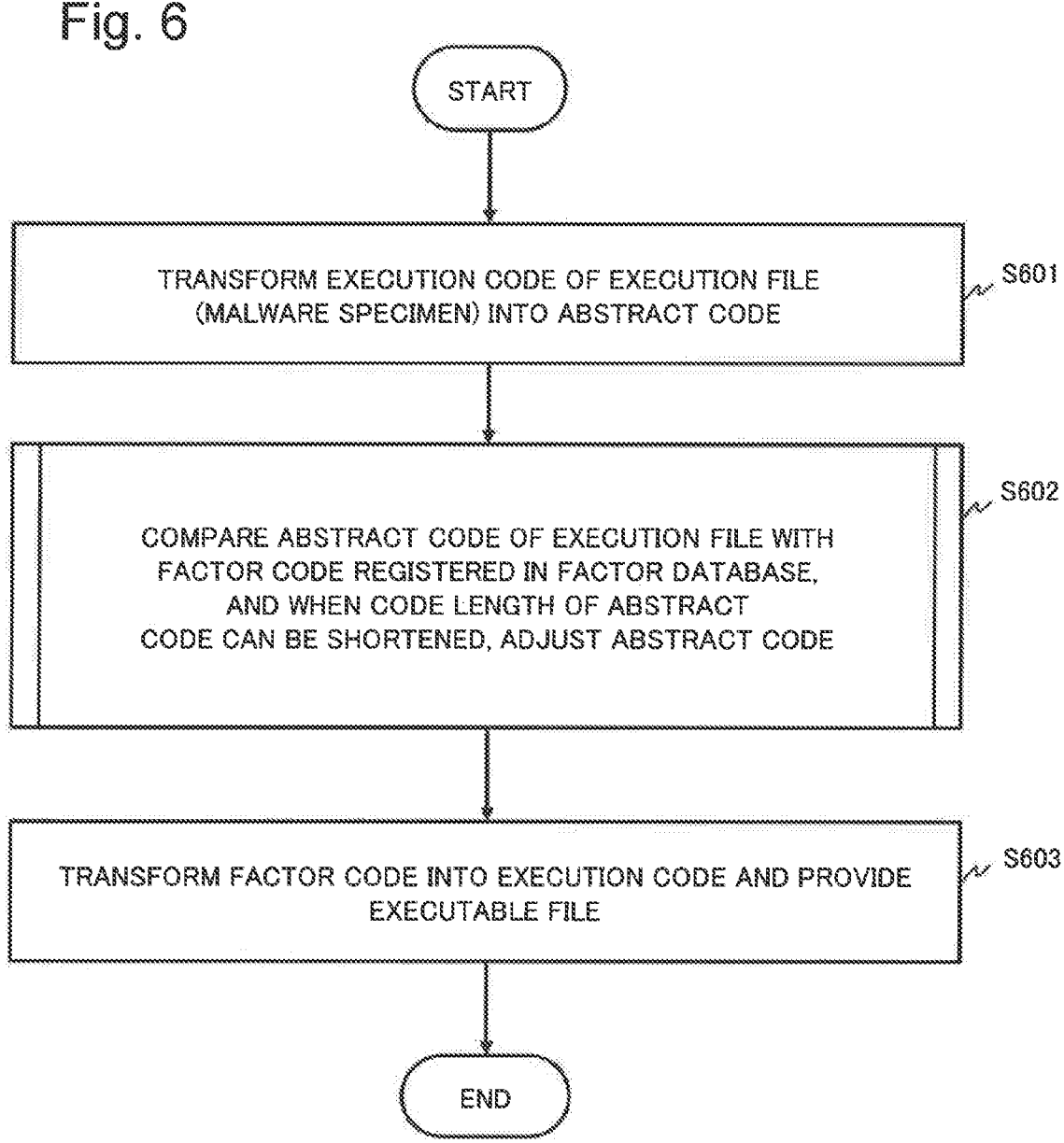
FIG. 6 is a flowchart illustrating an operation example of an execution file adjustment unit included in the program analysis system according to the first example embodiment of the present disclosure.

FIG. 6 is a flowchart illustrating a specific example of an operation of the execution file adjustment unit 112.

The execution file adjustment unit 112 transforms an execution code of an execution file 111 into an abstract code (Step S601). For example, the execution file 111 may be a specimen of malware provided by a user. The execution file adjustment unit 112 may transform the execution code of the execution file 111 into an abstract code by processing similar to that by the aforementioned factor extraction unit 104 and the factor search unit 108. Further, the execution file adjustment unit 112 may decompose an abstract code into factor codes.

The execution file adjustment unit 112 compares the abstract code transformed from the execution file 111 with a factor code registered in the factor database 105 and confirms whether or not a length of the original abstract code can be shortened (i.e. a code size can be reduced) by partially using the factor code registered in the factor database 105. At this time, for example, the execution file adjustment unit 112 may confirm whether the abstract code transformed from the execution file 111 can be adjusted in such a way that partial replacement of the abstract code does not influence a final output vector.

When the code length of the original abstract code can be shortened, the execution file adjustment unit 112 replaces at least part of the original abstract code with the factor code registered in the factor database 105 (Step S602). Specifically, for example, the execution file adjustment unit 112 replaces at least part of the abstract code transformed from the execution file 111 with a factor code extracted from a specimen registered in the system database 103. Consequently, part of an execution code included in the execution file 111 can be replaced by use of an instruction included in a regular (normal) execution code in a system.

In Step S602, the execution file adjustment unit 112 may repeat the processing described above on a set of factor codes held in the factor database 105 until a length of the abstract code is minimized.

The execution file adjustment unit 112 may transform the abstract code replaced in Step S602 into an execution code and output an output file 113 (Step S603). For example, the execution file adjustment unit 112 may generate an execution code by inverse-transforming the abstract code into an instruction sequence by referring to the aforementioned transformation information. For example, the execution file adjustment unit 112 may generate an execution file 111 by executing processing such as assembly or linking on an execution code.

Specific Example

The program analysis system 100 configured as described above will be described below by use of a specific example. A configuration of this specific example is similar to the configurations exemplified in FIGS. 1A and 1B.

For example, a user of the program analysis system 100 registers specimens in the vulnerability database 101, the malware database 102, and the system database 103 through maintenance work or the like.

Figure 23:
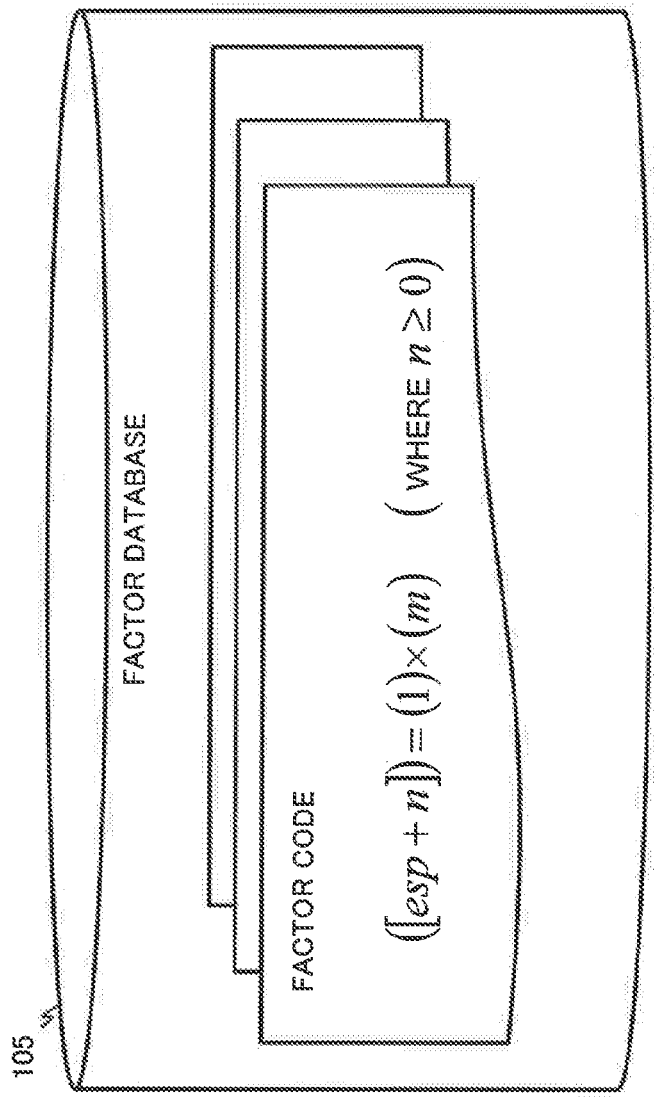
FIG. 23 is a diagram illustrating a specific example of a factor database according to the first example embodiment of the present disclosure.

Further, for example, it is assumed in this specific example that the program analysis system 100 holds data as exemplified in FIG. 22, as transformation information (dictionary data) associating an instruction sequence and an abstract code. For example, the factor extraction unit 104, the factor search unit 108, and the execution file adjustment unit 112 can transform various types of execution codes into abstract codes by use of such transformation information. The factor extraction unit 104 analyzes a specimen registered in each of the aforementioned databases and registers a factor code in the factor database 105. For example, it is assumed in this specific example that information indicating a success state as exemplified in FIG. 23 is registered in the factor database 105. In a factor code exemplified in FIG. 23, proper numerical values may be set to "m" and "n." For example, the factor code exemplified in FIG. 23 may be a mathematical model transformed from an execution code expressed as "(mov DWORD PTR[esp+n],m)."

By use of the success state registration unit 106, a user of the program analysis system 100 registers in the success state database 107 information indicating a state of an attack on a system being successful. For example, it is assumed in this specific example that information indicating a success state as exemplified in FIG. 24 is registered in the success state database 107.

Figure 25A:
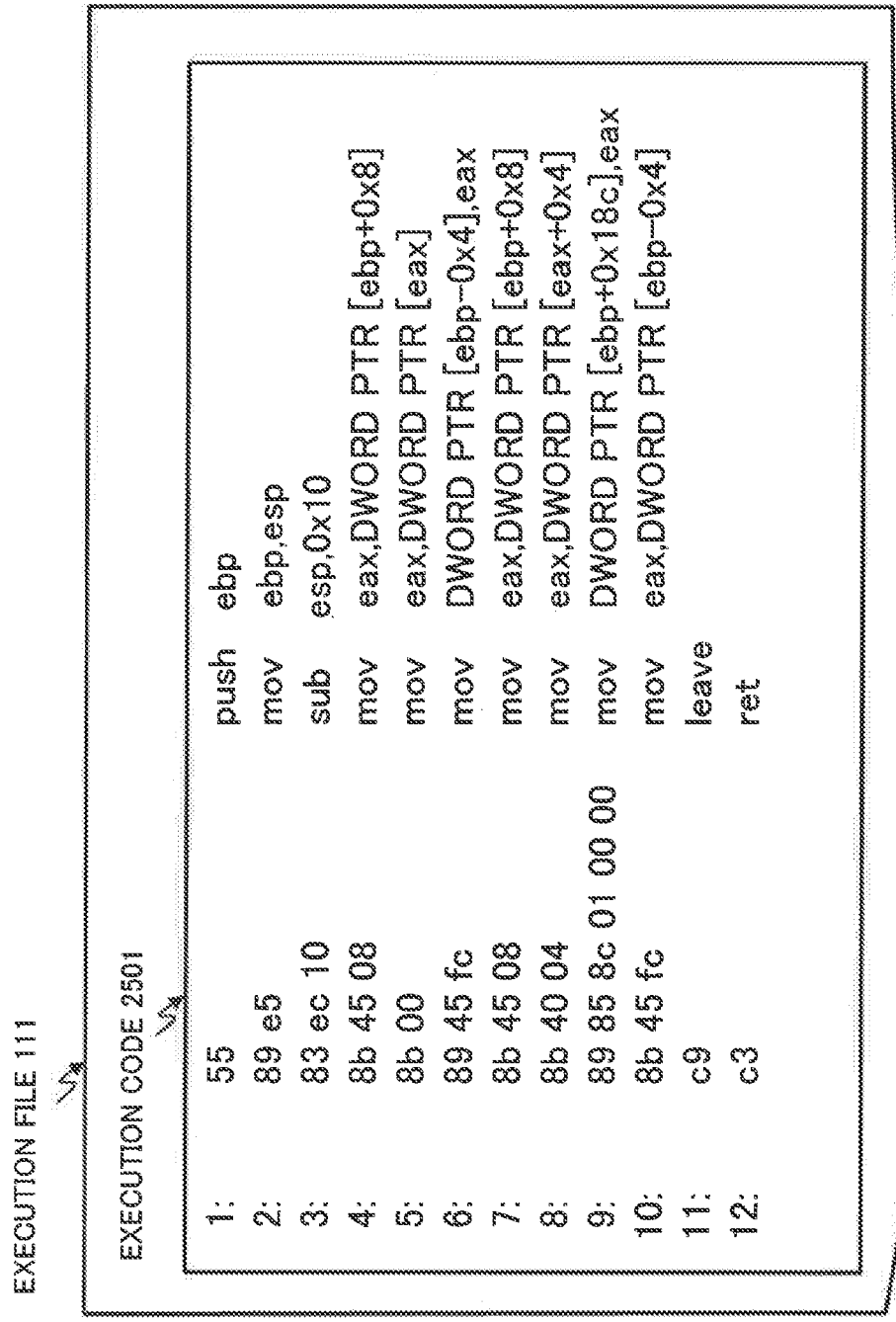
FIG. 25A is a diagram illustrating a specific example of an inspection-target execution code.

It is assumed in this specific example that an execution file 111 represented by an execution code 2501 as exemplified in FIG. 25A is inspected. For example, when inspecting whether or not an unknown execution file (execution file 111) found in a system to be protected is a fraudulent program (e.g. malware) using a vulnerability, a user provides the execution file 111 for the program analysis system 100. The factor search unit 108 transforms the provided execution file 111 into an abstract code. For example, the factor search unit 108 transforms 12 rows of instructions included in the execution code as exemplified in FIG. 25A into mappings by use of the transformation information exemplified in FIG. 22 or the like. As a result of such transformation, for example, each row of the execution code exemplified in FIG. 25A is transformable to a mathematical model exemplified in FIG. 25B. For example, the factor search unit 108 executes mapping integration processing by a product operation on each mathematical model exemplified in FIG. 25B. By such processing, the execution code exemplified in FIG. 25A is transformable to an abstract code 2601 exemplified in FIG. 26A. For example, the factor search unit 108 can acquire factor codes 2602 exemplified in FIG. 26B by decomposing the abstract code exemplified in FIG. 26A into factor codes.

The factor search unit 108 searches the factor database 105 and confirms whether or not a factor code corresponding to a decomposed factor code is registered in the factor database 105. In this specific example, a factor code corresponding to a factor code "([esp+392])=(1)×([[esp+4]+4])" in the factor code 2602 is registered in the factor database 105.

The factor search unit 108 compares a final operation state of the execution code 2501 (i.e. a variable in a final state in an output vector of the abstract code 2601) with information indicating a success state registered in the success state database 107. In this specific example, "([esp+392])=(1)× ([[esp+4]+4])" holds for "([esp+392])" in the output vector of the abstract code 2601. Then, as data indicating a success state, "([esp+n])=(1)×(m)" is registered in the success state database 107 (FIG. 24). From the above, the factor search unit 108 determines that the execution code 2501 is malware.

The factor search unit 108 provides the aforementioned determination result for the determination result providing unit 109. The determination result providing unit 109 generates information (data) indicating the aforementioned determination result and provides the information for the output device 110. A user of the program analysis system 100 confirms the inspection result with respect to the execution file 111 through an output (e.g. a screen display) of the output device 110.

Figure 28B:
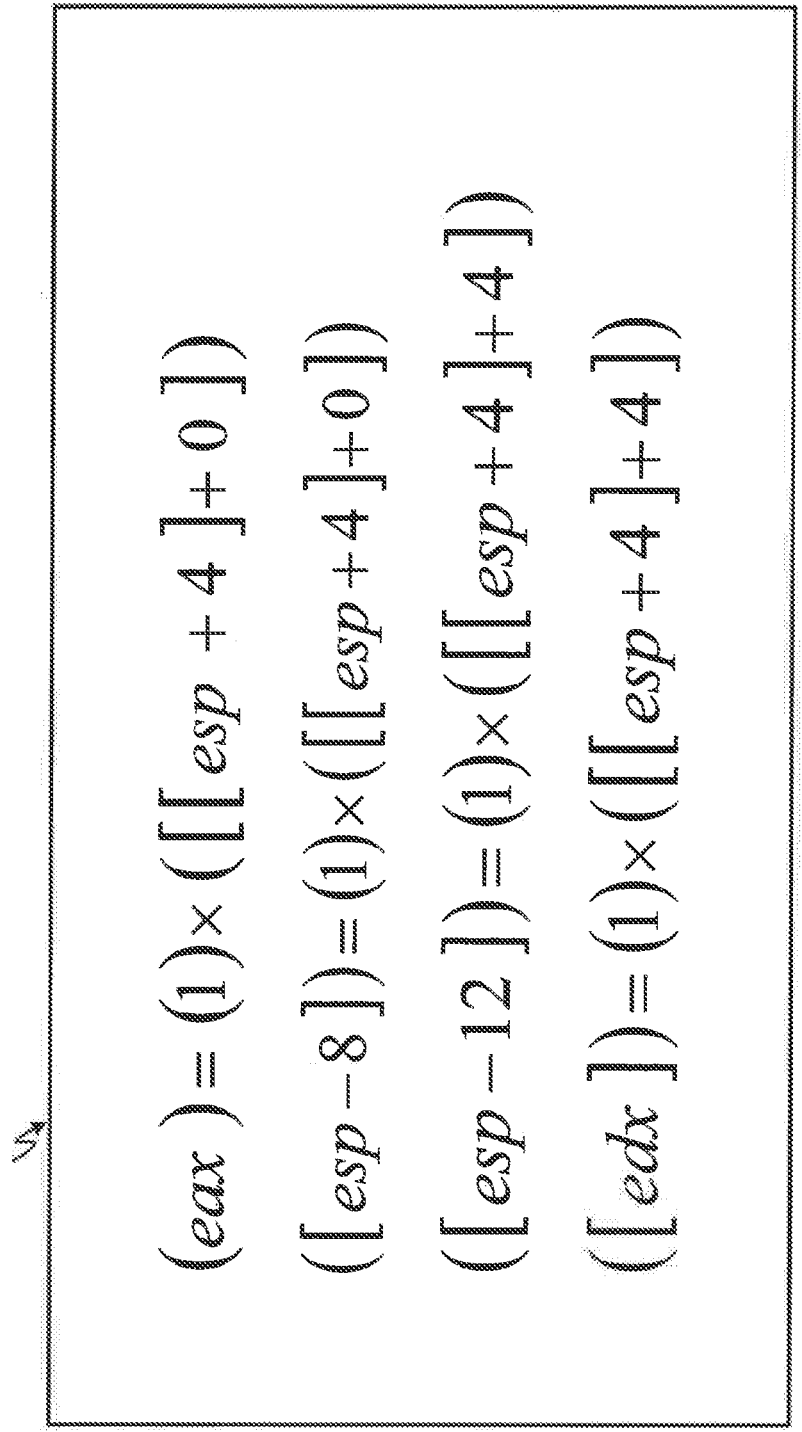
FIG. 28B is a diagram illustrating a specific example of a factor code decomposed from the abstract code exemplified in FIG. 28A.

It is assumed as a modified example of the program analysis system 100 below that, for example, a user provides an execution file 111 (execution code 2501) for the execution file adjustment unit 112 for the purpose of performing a penetration test. It is assumed below that an execution code 2701 exemplified in FIG. 27 is registered in the system database 103 as a known execution code. For example, such an execution code 2701 may be regular (normal) processing in a certain system. Further, it is assumed that the execution code 2701 is transformable to an abstract code 2801 as exemplified in FIG. 28A, and a factor code 2802 (FIG. 28B) obtained by decomposing the abstract code 2801 is registered in the factor database 105.

Similarly to the factor search unit 108, the execution file adjustment unit 112 analyzes the execution file 111 (execution code 2501) and acquires the abstract code 2601 and the factor code 2602.

The execution file adjustment unit 112 compares the factor code 2602 with the factor code 2802 registered in the factor database 105. In this case, terms "eax" and "[esp−8]" in the factor codes are common. In other words, when influence of the terms "[esp−12]" and "edx" in the factor code 2802 is eliminated, at least part of the execution code 2501 can be replaced by use of the execution code 2701. Accordingly, the execution file adjustment unit 112 shortens a code length of the execution code 2501 by replacing part of the execution code 2501 with a call to the execution code 2701.

Figure 29:
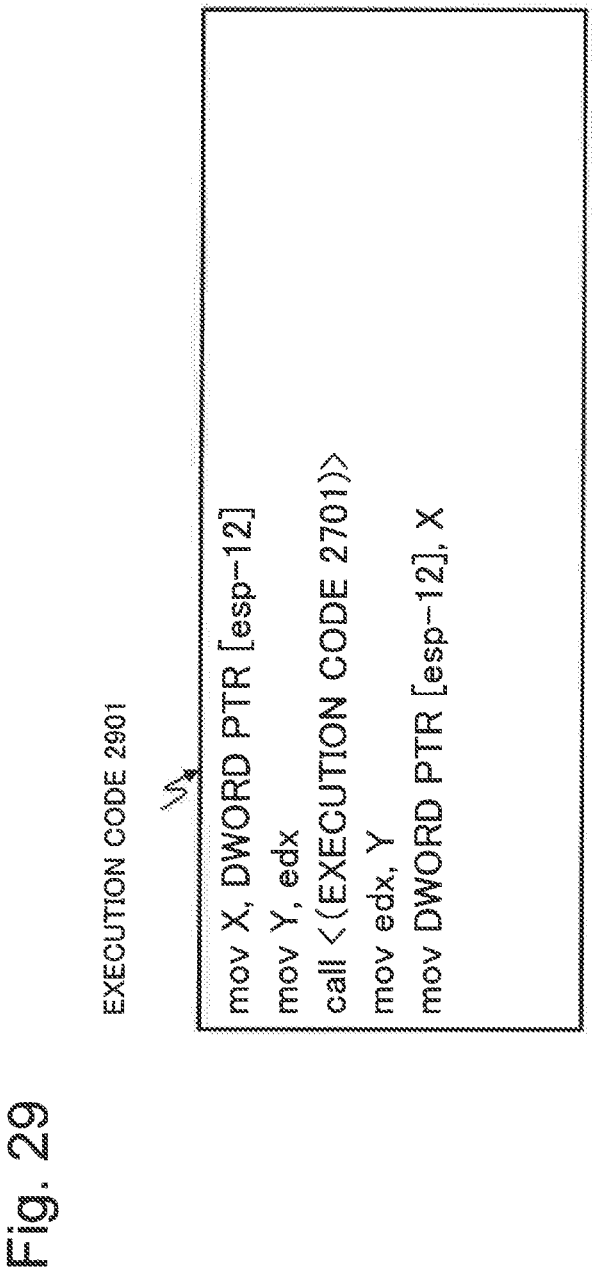
FIG. 29 is a diagram illustrating a specific example of an execution code obtained by shortening the execution code exemplified in FIG. 25A.

Specifically, the execution file adjustment unit 112 transforms the execution code 2501 into a shortened execution code 2901 exemplified in FIG. 29 by use of temporary save memory areas "X" and "Y." In the execution code 2901, values of "[esp−12]" and "edx" are temporarily compared by use of the temporary save memory areas "X" and "Y." Then, by "calling" the execution code 2701, processing implemented in the execution code 2701 is executed. Subsequently, the values of "[esp−12]" and "edx" saved in the temporary save memory areas "X" and "Y" are returned. Consequently, influence of the execution of the execution code 2701 on "[esp−12]" and "edx" can be eliminated. Further, the execution code 2901 has a shortened code length compared with the original execution code 2501. In other words, the execution file adjustment unit 112 can shorten the code length of the execution code 2501. The execution file adjustment unit 112 may output an output file 113 including the execution code 2901.

For example, a user can perform a penetration test on a system to be inspected by use of the output file 113. The execution code 2901 included in the output file 113 has a shorter code size than the execution code 2501. Further, most of processing in the execution code 2901 is executed by the execution code 2701 (regular processing in the system). In other words, the output file 113 has a feature of not being easily distinguished from the regular (legitimate) processing executed in the system and having a smaller code size. It is considered that, by using such an output file 113, a user can execute a more advanced test.

The program analysis system 100 configured as described above can determine whether or not an execution code is an attack code and can detect an unknown attack code. The reason is as follows. The program analysis system 100 compares a mathematical model (factor code) transformed from an inspection-target execution code with a mathematical model (factor code) transformed from a specimen such as a known vulnerability, malware, and a system. Consequently, the program analysis system 100 can confirm whether the inspection-target execution code includes a factor corresponding to an attack code. Further, the program analysis system 100 compares a final operation state of an inspection-target execution code with a success state being a state of an attack related to a system being successful. Consequently, the program analysis system 100 can determine whether or not some attack succeeds by executing the inspection-target execution code. In other words, the program analysis system 100 inspects an execution code from viewpoints of whether the execution code includes an attack factor and whether an execution state of the execution code is in a (known) attack success state. Consequently, for example, the program analysis system 100 can detect an execution code attacking a vulnerability, regardless of whether such a vulnerability is known or unknown. From the above, for example, the program analysis system 100 is expected to deter a zero-day attack by detecting an execution code using an unknown vulnerability.

Further, for example, the modified example of the program analysis system 100 is expected to improve a capability to detect an activity by a fraudulent program capable of being continuously active. The reason is as follows. Specifically, taking into consideration a characteristic of a continuously active fraudulent program that a code size of the program is relatively small, the program analysis system 100 reduces a code size by replacing a factor code constituting a fraudulent program to be inspected. Consequently, the program analysis system 100 can generate an execution code applicable to an inspection (test) assuming intrusion of a fraudulent program with a relatively small code size. In other words, the program analysis system 100 enables implementation of a penetration test using a fraudulent program with a relatively small code size.

By configuring the program analysis system 100 as described above, a content of a program to be inspected can be properly analyzed, and by use of the result, an attack by a fraudulent program may be controlled.

Second Example Embodiment

A second example embodiment being a basic example embodiment of the technology according to the present disclosure will be described below.

Figure 30:
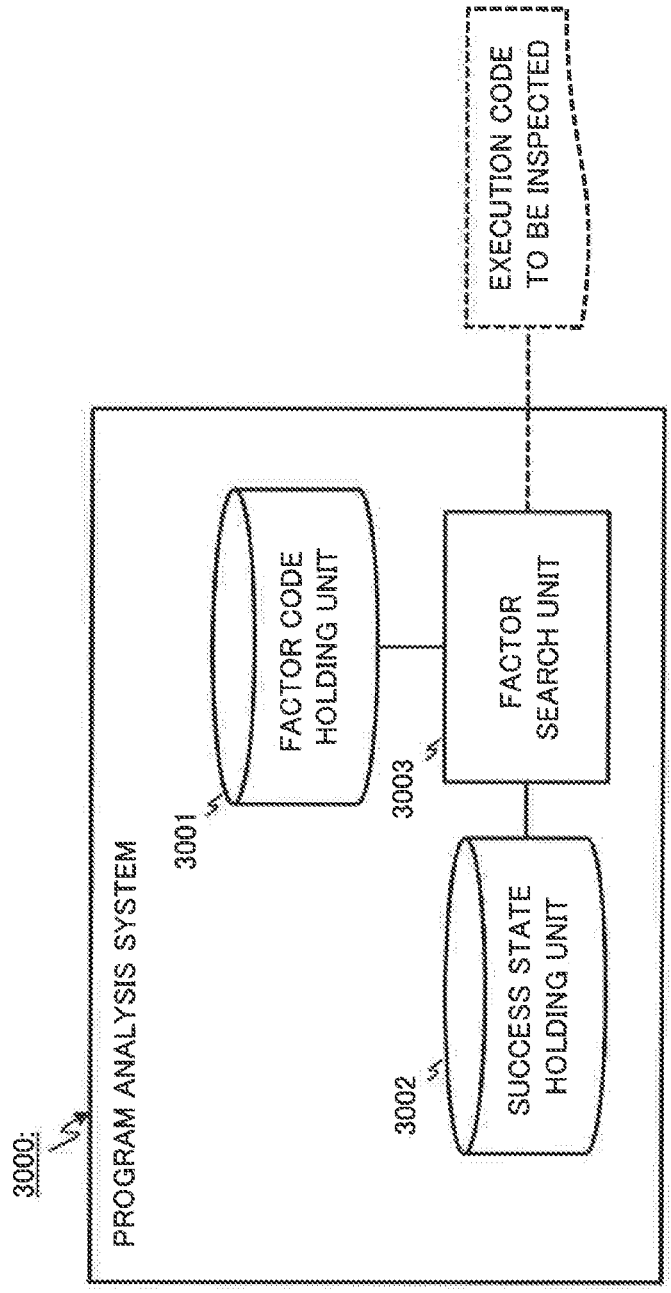
FIG. 30 is a block diagram exemplifying a functional configuration of a program analysis system according to a second example embodiment of the present disclosure.

FIG. 30 is a block diagram exemplifying a functional configuration of a program analysis system 3000 according to the present example embodiment. As exemplified in FIG. 30, the program analysis system 3000 according to the present example embodiment includes a factor code holding unit 3001 (factor code holding means), a success state holding unit 3002 (success state holding means), and a factor search unit 3003 (factor search means).

The factor code holding unit 3001 holds a known factor code being data representing a known execution code transformed into a mathematical model. For example, the factor code holding unit 3001 can be provided by use of a file in a database or a file system. The factor code holding unit 3001 may be configured similarly to the factor database 105 according to the aforementioned first example embodiment.

For example, similarly to the aforementioned first example embodiment, known factor codes extracted from a specimen of an attack code attacking a known vulnerability, a specimen of known malware, a specimen of a regular (normal) execution code in a system, and the like may be registered in the factor code holding unit 3001.

The success state holding unit 3002 holds a success state information indicating a state of an attack by a fraudulent program being successful. For example, the success state holding unit 3002 can be provided by use of a file in a database or a file system. The success state holding unit 3002 may be configured similarly to the success state database 107 according to the aforementioned first example embodiment.

The factor search unit 3003 generates an analysis-target abstract code being data representing an inspection-target execution code transformed into a mathematical model. The factor search unit 3003 executes processing of determining whether or not the generated analysis-target abstract code includes a known factor code held in the factor code holding unit 3001. Further, the factor search unit 3003 executes processing of determining whether or not a state at the end of execution of an inspection-target execution code is included in success state information held in the success state holding unit 3002. Depending on the processing result, the factor search unit 3003 determines whether or not the inspection-target execution code is a fraudulent program.

For example, when an analysis-target abstract code includes a known factor code held in the factor code holding unit 3001, and also a state at the end of execution of an inspection-target execution code is included in success state information held in the success state holding unit 3002, the factor search unit 3003 may determine that the inspection-target execution code is a fraudulent program.

Similarly to the aforementioned first example embodiment, the aforementioned mathematical model may be a model representing an instruction included in an execution code, by use of one or more mappings and input vectors and output vectors related to the mappings. Similarly to the aforementioned first example embodiment, such a mathematical model may be expressed by any one of a linear function, a nonlinear function, and an external function.

The factor search unit 3003 may generate an analysis-target abstract code by transforming one or more instruction sequences included in an inspection-target execution code into mappings and integrating the one or more transformed mappings by a product operation.

For example, the factor search unit 3003 may transform one or more instruction sequences included in an inspection-target execution code into mappings, by use of transformation information associating an instruction included in the inspection-target execution code with a mapping representing the instruction.

For example, the factor search unit 3003 may be configured to provide a function similar to that of the factor search unit 108 according to the aforementioned first example embodiment.

Figure 31:
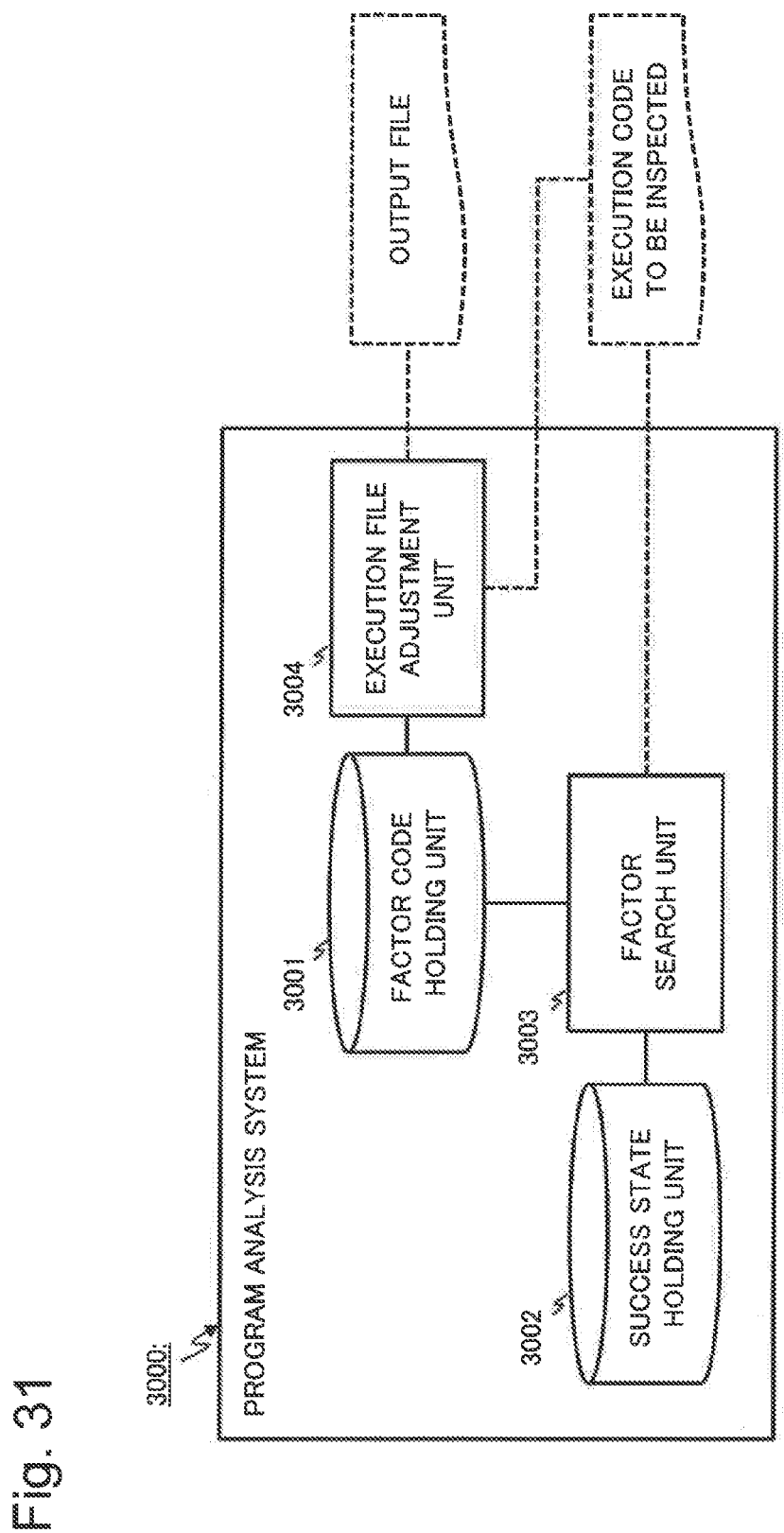
FIG. 31 is a block diagram exemplifying a modified example of the program analysis system according to the second example embodiment of the present disclosure.

Further, as a modified example, the program analysis system 3000 according to the present example embodiment may further include an execution file adjustment unit 3004 (FIG. 31).

For example, the execution file adjustment unit 3004 can transform an inspection-target execution code into an analysis-target abstract code by use of transformation information and also further decompose the analysis-target abstract code into analysis-target factor codes.

For example, the execution file adjustment unit 3004 may determine whether a size of an inspection-target execution code can be reduced by replacing at least part of a analysis-target factor code included in an analysis-target abstract code with a known factor code held in the factor code holding unit 3001. When the size of the inspection-target execution code can be reduced, the execution file adjustment unit 3004 may replace at least part of the analysis-target factor code included in the analysis-target abstract code with the known factor code held in the factor code holding unit 3001.

By configuring the program analysis system 3000 according to the present disclosure as described above, for example, an attack caused by an unknown fraudulent program may be deterred. The reason is that the program analysis system 3000 (the factor search unit 3003 in particular) can determine whether or not an inspection-target execution code includes an attack factor, by comparing a analysis-target factor code acquired from the inspection-target execution code with a known factor code included in a fraudulent program. Further, the program analysis system according to the present disclosure can determine whether or not a state after execution of an inspection-target execution code is in a state of an attack being successful (success state).

Further, by thus configuring the program analysis system 3000 according to the present disclosure, for example, a capability to detect an activity by a fraudulent program capable of being continuously active may be improved. The reason is as follows. It is considered that a fraudulent program being continuously active has a characteristic of having a small code size compared with another fraudulent program. Accordingly, the program analysis system 3000 (the execution file adjustment unit 3004 in particular) reduces a size of an inspection-target execution code by replacing a analysis-target factor code constituting the inspection-target execution code. Consequently, such a program analysis system 3000 can generate an output file applicable to an inspection (test) assuming intrusion of a fraudulent program with a relatively small code size. In other words, such a program analysis system 3000 enables implementation of a penetration test using a fraudulent program with a relatively small code size.

By configuring the program analysis system 3000 according to the present disclosure as described above, a content of a program to be inspected can be properly analyzed, and by use of the result, an attack by a fraudulent program may be controlled.

The technology according to the present disclosure has been described above as examples applied to the program analysis systems (100, 3000), according to the respective aforementioned example embodiments. For example, a program analysis method according to the present disclosure can be performed by operating the program analysis systems (100, 3000) according to the respective aforementioned example embodiments. A method of performing the program analysis method according to the present disclosure is not limited to the above, and the program analysis method according to the present disclosure may be performed by use of another device (e.g. an information processing device such as a computer) capable of executing an operation or processing similar to that of the program analysis systems (100, 3000).

For example, the technology according to the present disclosure is applicable to a use such as a malware analysis device or a program capable of providing a malware analysis device by use of a computer. Further, for example, the technology according to the present disclosure is applicable to a use such as classification of malware and generation of a subspecies of malware.

Hardware and Software Program (Computer Program) Configurations

A hardware configuration capable of providing the respective aforementioned example embodiments will be described below.

In the following description, the program analysis systems (100, 3000) described in the respective aforementioned example embodiments are simply referred to as a "program analysis system." Further, each component in the program analysis systems may be simply referred to as a "component of a program analysis system."

The program analysis system described in the respective aforementioned example embodiments may be composed of one or more dedicated hardware devices. In that case, the respective components illustrated in the respective aforementioned drawings (FIGS. 1A, 1B, 30, and 31) may be provided by use of hardware (e.g. an integrated circuit or a storage device on which processing logic is implemented) integrating the components in part or in whole.

When the program analysis system is provided by dedicated hardware, for example, each component in such a program analysis system may be provided by circuitry capable of providing each function. For example, such circuitry includes an integrated circuit such as a system on a chip (SoC), a chipset provided by use of the integrated circuit, or the like. In this case, data held by a component of the program analysis system may be stored in, for example, a random access memory (RAM) area and a flash memory area integrated as an SoC, or a storage device (e.g. a semiconductor storage device) connected to the SoC. Further, in this case, a well-known communication bus or the like may be employed as a communication line connecting the respective components in the program analysis system. Further, the communication line connecting the respective components may connect the respective components on a peer-to-peer basis.

Figure 32:
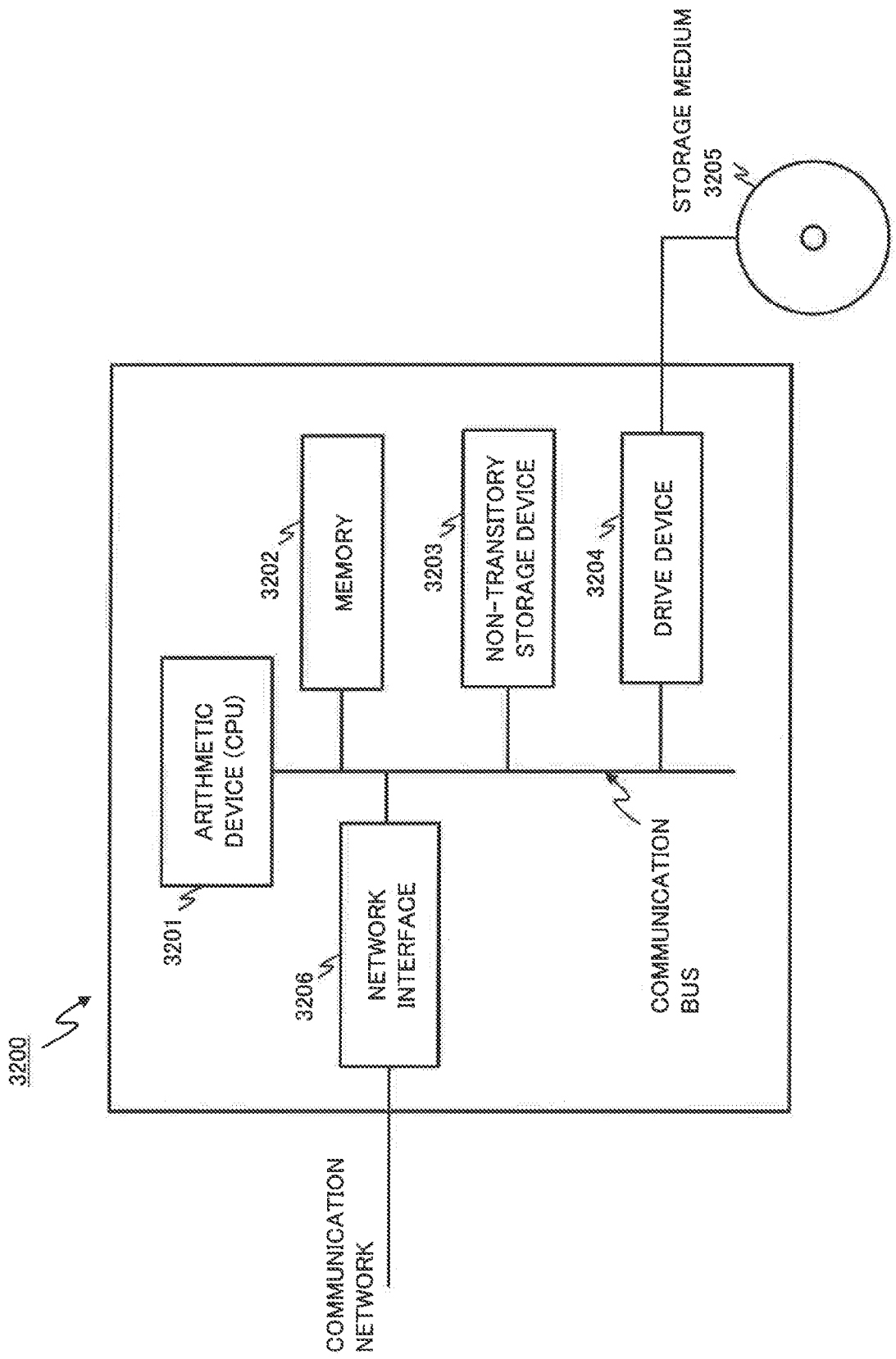
FIG. 32 is a diagram exemplifying a configuration of a hardware device capable of providing components of the analysis systems according to the respective example embodiments of the present invention.

Further, the aforementioned program analysis system may be composed of a general-purpose hardware device 3200 as exemplified in FIG. 32 and various types of software programs (computer programs) executed by such a hardware device 3200. In this case, the program analysis system may be composed of a combination of a proper number (one or more) of general-purpose hardware devices 3200 and software programs.

An arithmetic device 3201 in FIG. 32 is an arithmetic processing device such as a general-purpose central processing unit (CPU) or a microprocessor. For example, the arithmetic device 3201 may read various types of software programs stored in a non-transitory storage device 3203, to be described later, into a memory 3202 and execute processing in accordance with such software programs. For example, a function of a component in the program analysis system according to the respective aforementioned example embodiments may be provided by use of the software program executed by the arithmetic device 3201.

For example, the arithmetic device 3201 may be a multicore CPU including a plurality of CPU cores. Further, the arithmetic device 3201 may be a multithread CPU being a single CPU core capable of executing a plurality of threads. The hardware device 3200 may include a plurality of arithmetic devices 3201.

The memory 3202 is a memory device, such as a RAM, being referenceable from the arithmetic device 3201 and stores a software program, various types of data, and the like. The memory 3202 may be a transitory memory.

For example, the non-transitory storage device 3203 is a non-transitory storage device such as a magnetic disk drive, a semiconductor storage device based on a flash memory, or the like. The non-transitory storage device 3203 can store various types of software programs, data, and the like. For example, a program capable of providing each component in the program analysis system may be stored in the non-transitory storage device 3203.

For example, a drive device 3204 is a device processing read and write of data from and to a storage medium 3205 to be described later.

For example, the storage medium 3205 is any data-recordable storage medium such as an optical disk, a magneto-optical disk, or a semiconductor flash memory. For example, a program capable of providing each component in the program analysis system may be recorded in the storage medium 3205.

A network interface 3206 is a device controlling transmission and reception of communication data to and from a communication network. For example, the network interface 3206 may include one or more communication ports, and transmit and receive communication data to and from the communication network through such communication ports. The network interface 3206 may include a plurality of communication ports.

For example, the components in the hardware device 3200 exemplified in FIG. 32 may be communicably connected by use of a proper communication method (e.g. a communication bus).

The program analysis system according to the present disclosure described with the respective aforementioned example embodiments as examples, or a component of the system may be provided by, for example, supplying to the hardware device 3200 exemplified in FIG. 32 a software program capable of providing the function described in the respective aforementioned example embodiments.

More specifically, for example, the technology according to the present disclosure may be provided by the arithmetic device 3201 executing a software program supplied to such a hardware device 3200. In this case, an operating system, middleware such as database management software, network software, and a virtual environment infrastructure, and the like that operate on such a hardware device 3200 may execute part of each type of processing.

Each unit illustrated in the respective aforementioned drawings in the respective aforementioned example embodiments may be provided as a software module being a function (processing) unit of the software program executed by the aforementioned hardware. However, allocation of the respective software modules illustrated in the drawings is a configuration for convenience of description, and various configurations may be assumed at implementation.

When the respective components in the program analysis system exemplified in the respective drawings being FIGS. 1A, 1B, 30, and 31 are provided as software modules, for example, the software modules may be stored in the non-transitory storage device 3203. Then, when executing respective types of processing, the arithmetic device 3201 may read the software modules into the memory 3202.

Further, the software modules may be configured in such a way that various types of data can be mutually conveyed by an appropriate method such as a shared memory or inter-process communication. With such a configuration, the software modules are communicably connected to one another.

Furthermore, the aforementioned software program may be recorded in the storage medium 3205. In this case, the aforementioned software program may be configured to be appropriately stored in the non-transitory storage device 3203 through the drive device 3204 at a shipping stage, an operation stage, or the like of the program analysis system.

As a supply method of various types of software programs to the aforementioned hardware device 3200 in the case described above, a method of installation into the device by use of an appropriate jig (tool) at a manufacture stage before shipment, a maintenance stage after shipment, or the like may be employed. Further, as the supply method of various types of software programs, a currently common procedure such as a method of external download through a communication line such as the Internet may be employed.

Then, in such a case, the technology according to the present disclosure may be viewed to be configured with codes constituting such software programs or a computer-readable storage medium recording such codes. In this case, such a storage medium is not limited to a medium separate from the hardware device 3200 and includes a storage medium storing or temporarily storing the software programs transmitted and downloaded through a local area network (LAN), the Internet, or the like.

Further, a component of the aforementioned program analysis system may be composed of a virtualization environment virtualizing the hardware device 3200 exemplified in FIG. 32 and various types of software programs (computer programs) executed in the virtualization environment. In this case, a component of the hardware device 3200 exemplified in FIG. 32 is provided as a virtual device in the virtualization environment. In this case, the technology according to the present disclosure can also be provided with a configuration similar to the case of the hardware device 3200 exemplified in FIG. 32 being configured as a physical device.

The technology according to the present disclosure has been described above as examples applied to the aforementioned exemplary example embodiments. However, the technical scope of the present disclosure is not limited to the respective aforementioned example embodiments. It is obvious to a person skilled in the art that various changes or modifications can be made to such example embodiments. In such a case, a new example embodiment with such a change or modification may be included in the technical scope of the present disclosure. An example embodiment combining the respective aforementioned example embodiments is also included in the technical scope of the present disclosure. Furthermore, an example embodiment combining the respective aforementioned example embodiments and new example embodiments with changes or modifications added to the respective aforementioned example embodiments may be included in the technical scope of the present disclosure. This is obvious from matters described in CLAIMS.

Furthermore, the aforementioned example embodiments and modified examples thereof may also be described in part or in whole as the following Supplementary Notes. However, the technology according to the present disclosure exemplified in the aforementioned example embodiments and modified examples thereof is not limited to the following.

(Supplementary Note 1)

A program analysis system including:

factor code holding means for holding a known factor code that is data representing a mathematical model into which a known execution code transformed;

success state holding means for holding success state information indicating a state in which an attack by a fraudulent program is successful; and factor search means for determining whether or not an inspection-target execution code is a fraudulent program by executing at least processing of generating an analysis-target abstract code that is data representing a mathematical model into which the inspection-target execution code is transformed and determining whether or not the analysis-target abstract code includes the known factor code held in the factor code holding means, and processing of determining whether or not a state at an end of execution of the inspection-target execution code is included in the success state information held in the success state holding means.

(Supplementary Note 2)

The program analysis system according to Supplementary Note 1, wherein the factor search means determines that the inspection-target execution code is a fraudulent program when the analysis-target abstract code includes the known factor code held in the factor code holding means and a state at an end of execution of the inspection-target execution code is included in the success state information held in the success state holding means.

(Supplementary Note 3)

The program analysis system according to Supplementary Note 2, wherein the factor search means:

further decomposes the analysis-target abstract code into analysis-target factor codes being relatively prime factor codes when the known factor code held in the factor code holding means is determined to be not included in the analysis-target abstract code;

further executes processing of determining whether or not the known factor code is included in the analysis-target abstract code the analysis-target factor codes of which is rearranged at least partly when the decomposed analysis-target factor codes which are rearranged at least partly is equivalent to the analysis-target abstract code before rearranging in a result of execution; and determines that the inspection-target execution code is a fraudulent program when the analysis-target abstract code the analysis-target factor codes of which are rearranged at least partly includes the known factor code, and a state at an end of execution of the inspection-target execution code is included in the success state information held in the success state holding means.

(Supplementary Note 4)

The program analysis system according to any one of Supplementary Notes 1 to 3, wherein the mathematical model is a model representing an instruction included in a certain execution code by use of one or more mappings, an input vector and an output vector, the input vector and the output vector being related to the mappings, and the factor search means generates the analysis-target abstract code by transforming one or more instruction sequences included in the inspection-target execution code into the mappings and integrating the mappings by calculating a product of multiplying one or more of the mappings generated by transforming.

(Supplementary Note 5)

The program analysis system according to Supplementary Note 4, wherein an element of the input vector and the output vector in the mathematical model is information indicating a state of an information processing device in which the inspection-target execution code is executed, the information including at least information indicating a content of a register implemented in an arithmetic device included in the information processing device in which the inspection-target execution code is executed and information indicating a content of a specific address in a memory included in the information processing device in which the inspection-target execution code is executed, and the factor search means determines whether or not an element of the output vector is included in the success state information held in the success state holding means, the element of the output vector indicating a state of an end of execution of the inspection-target execution code.

(Supplementary Note 6)

The program analysis system according to Supplementary Note 4 or 5, wherein the factor search means transforms one or more instruction sequences included in the inspection-target execution code into the mappings by use of transformation information associating an instruction included in an execution code with the mapping that is the mathematical model representing the instruction.

(Supplementary Note 7)

The program analysis system according to Supplementary Note 6, further including:

vulnerability data holding means for holding a specimen of an execution code executing an attack using a vulnerability;

fraudulent program data holding means for holding a specimen of a known fraudulent program; and factor extraction means for generating a known abstract code that is data representing the mathematical model into which an execution code is transformed by use of the transformation information, the execution code being of at least either one of a specimen held in the vulnerability data holding means and a specimen held in a fraudulent program data holding unit, and providing the factor code holding means with the known factor code into which the known abstract code is decomposed, wherein the factor search means determines that the inspection-target execution code is a fraudulent program when the analysis-target abstract code includes at least either one of the known factor code acquired from a specimen held in the vulnerability data holding means and the known factor code acquired from a specimen held in the fraudulent program data holding unit, and a state at an end of execution of the inspection-target execution code is included in the success state information held in the success state holding means.

(Supplementary Note 8)

The program analysis system according to Supplementary Note 6, further including:

system data holding means for holding a specimen of an execution code executed in a system operating normally;

factor extraction means for generating a known abstract code that is data representing the mathematical model into which an execution code of a specimen held in the system data holding means is transformed by use of the transformation information, and providing the factor code holding means with the known factor code into which the known abstract code is decomposed; and execution file adjustment means for transforming the inspection-target execution code into the analysis-target abstract code by use of the transformation information, and generating an execution code with a code size reduced in comparison with the original inspection-target execution code by replacing at least part of the analysis-target abstract code with the known factor code acquired from an execution code of a specimen held in the system data holding means.

(Supplementary Note 9)

The program analysis system according to any one of Supplementary Notes 4 to 8, wherein, when the mapping is represented by a linear function including a single transformation matrix, the factor search means integrates the mappings into which the instruction sequences included in the execution code is transformed by calculating a product of transformation matrices each included in the mappings into which the instruction sequences included in the execution code is transformed.

(Supplementary Note 10)

A program analysis method including:

generating an analysis-target abstract code that is data representing a mathematical model into which an inspection-target execution code is transformed; and determining whether or not the inspection-target execution code is a fraudulent program by executing at least processing of determining whether or not the analysis-target abstract code includes a known factor code that is data representing a mathematical model into which a known execution code is transformed, and processing of determining whether or not a state at an end of execution of the inspection-target execution code is included in success state information indicating a state in which an attack by a fraudulent program is successful.

(Supplementary Note 11)

A storage medium storing a computer program causing a computer to execute:

processing of generating an analysis-target abstract code that is data representing a mathematical model into which an inspection-target execution code is transformed; and processing of determining whether or not the inspection-target execution code is a fraudulent program by executing at least processing of determining whether or not the analysis-target abstract code includes a known factor code that is data representing a mathematical model into which a known execution code is transformed, and processing of determining whether or not a state at an end of execution of the inspection-target execution code is included in success state information indicating a state in which an attack by a fraudulent program is successful.

(Supplementary Note 12)

An anti-malware system including:

input means for inputting a success state of an attack;

means for storing the success state;

storage means for storing an execution code for a known vulnerability;

means for extracting, from the execution code for the known vulnerability, factors that are data capable of representing at least part of the execution code;

storage means for storing an execution code of known malware;

means for extracting factors included in the execution code of the known malware;

storage means for storing the factors;

search means for searching any execution code for the factors;

determination means for determining whether one or more of the factors are represented by a subset of others of the factors while maintaining an equivalent operation;

determination means for determining whether a final operation state in a case where the factors are replaced by the subset of the others of the factors exists in the success state; and display means for displaying a result of the determining.

(Supplementary Note 13)

The anti-malware system according to Supplementary Note 12, further including:

storage means for storing a known system;

means for extracting the factors from an execution code for the known system;

means for minimizing the execution code for the known system by replacing the extracted factors with the subset of the other of the factors; and means for outputting the minimized execution code.

This application claims priority based on Japanese Patent Application No. 2016-088278 filed on Apr. 26, 2016, the disclosure of which is hereby incorporated by reference thereto in its entirety.

REFERENCE SIGNS LIST

100 Program analysis system
101 Vulnerability database
102 Malware database
103 System database
104 Factor extraction unit
105 Factor database
106 Success state registration unit
107 Success state database
108 Factor search unit
109 Determination result providing unit
110 Output device
111 Execution file
112 Execution file adjustment unit
113 Output file
3001 Factor code holding unit
3002 Success state holding unit
3003 Factor search unit
3004 Execution file adjustment unit
3201 Arithmetic device
3202 Memory
3203 Non-transitory storage device
3204 Drive device
3205 Storage medium
3206 Network interface

What is claimed is:

1. A program analysis system comprising:
a memory that stores:
a set of instructions;
a known factor code that is data representing a mathematical model into which a known execution code is transformed; and
success state information indicating a state in which an attack by a fraudulent program is successful; and
at least one processor configured to execute the set of instructions to
determine whether or not an inspection-target execution code is a fraudulent program by executing at least processing of generating an analysis-target abstract code that is data representing a mathematical model into which the inspection-target execution code is transformed and determining whether or not the analysis-target abstract code includes the known factor code held in the memory, and processing of determining whether or not a state at an end of execution of the inspection-target execution code is included in the success state information held in the memory,
determine that the inspection-target execution code is a fraudulent program when the analysis-target abstract code includes the known factor code held in the memory and a state at an end of execution of the inspection-target execution code is included in the success state information held in the memory;
decompose the analysis-target abstract code into analysis-target factor codes being relatively prime factor codes that do not have a dependence between a factor code and another factor code in which a variable in an output vector is included in common when the known factor code held in the memory is determined to be not included in the analysis-target abstract code;
execute processing of determining whether or not the known factor code is included in the analysis-target abstract code after rearranging the analysis-target factor codes at least partly when the decomposed analysis-target factor codes which are rearranged at least partly is equivalent to the analysis-target abstract code before rearranging in a result of execution; and
determine that the inspection-target execution code is a fraudulent program when the analysis-target abstract code after rearranging the analysis-target factor codes at least partly includes the known factor code, and a state at an end of execution of the inspection-target execution code is included in the success state information held in the memory.

2. The program analysis system according to claim 1, wherein
the mathematical model is a model representing an instruction included in a certain execution code by use of one or more mappings, an input vector and an output vector, the input vector and the output vector being related to the mappings, and
the at least one processor is further configured to
generate the analysis-target abstract code by transforming one or more instruction sequences included in the inspection-target execution code into the mappings and integrating the mappings by calculating a product of multiplying one or more of the mappings generated by transforming.

3. The program analysis system according to claim 2, wherein
an element of the input vector and the output vector in the mathematical model is information indicating a state of an information processing device in which the inspection-target execution code is executed, the information including at least information indicating a content of a register implemented in an arithmetic device included in the information processing device in which the inspection-target execution code is executed and information indicating a content of a specific address in a memory included in the information processing device in which the inspection-target execution code is executed, and
the at least one processor is further configured to
determine whether or not an element of the output vector is included in the success state information held in the memory, the element of the output vector indicating a state of an end of execution of the inspection-target execution code.

4. The program analysis system according to claim 2, wherein
the at least one processor is further configured to
transform one or more instruction sequences included in the inspection-target execution code into the mappings by use of transformation information associating an instruction included in an execution code with the mapping that is the mathematical model representing the instruction.

5. The program analysis system according to claim 4, wherein
the memory is further configured to:
store a specimen of an execution code executing an attack using a vulnerability; and
store a specimen of a known fraudulent program, and
the at least one processor is further configured to:
generate a known abstract code that is data representing the mathematical model into which an execution code is transformed by use of the transformation information, the execution code being of at least either one of a specimen held in the memory and a specimen held in a fraudulent program data holding unit, and providing the memory with the known factor code into which the known abstract code is decomposed; and
determine that the inspection-target execution code is a fraudulent program when the analysis-target abstract code includes at least either one of the known factor code acquired from a specimen held in the memory and the known factor code acquired from a specimen held in the fraudulent program data holding unit, and a state at an end of execution of the inspection-target execution code is included in the success state information held in the memory.

6. The program analysis system according to claim 4, wherein
the memory is further configured to
store a specimen of an execution code executed in a system operating normally, and
the at least one processor is further configured to:
generate a known abstract code that is data representing the mathematical model into which an execution code of a specimen held in the memory is transformed by use of the transformation information, and providing the memory with the known factor code into which the known abstract code is decomposed; and
transform the inspection-target execution code into the analysis-target abstract code by use of the transformation information, and generating an execution code with a code size reduced in comparison with the original inspection-target execution code by replacing at least part of the analysis-target abstract code with the known factor code acquired from an execution code of a specimen held in the memory.

7. The program analysis system according to claim 2, wherein
the at least one processor is further configured to
integrate the mappings into which the instruction sequences included in the execution code is transformed by calculating a product of transformation matrices each included in the mappings into which the instruction sequences included in the execution code is transformed, when the mapping is represented by a linear function including a single transformation matrix.

8. A program analysis method comprising:
generating an analysis-target abstract code that is data representing a mathematical model into which an inspection-target execution code is transformed;
determining whether or not the inspection-target execution code is a fraudulent program by executing at least processing of determining whether or not the analysis-target abstract code includes a known factor code that is data representing a mathematical model into which a known execution code is transformed, and processing of determining whether or not a state at an end of execution of the inspection-target execution code is included in success state information indicating a state in which an attack by a fraudulent program is successful;
determining that the inspection-target execution code is a fraudulent program when the analysis-target abstract code includes the known factor code and a state at an end of execution of the inspection-target execution code is included in the success state information;
decomposing the analysis-target abstract code into analysis-target factor codes being relatively prime factor codes that do not have a dependence between a factor code and another factor code in which a variable in an output vector is included in common when the known factor code is determined to be not included in the analysis-target abstract code;
executing processing of determining whether or not the known factor code is included in the analysis-target abstract code after rearranging the analysis-target factor codes at least partly when the decomposed analysis-target factor codes which are rearranged at least partly is equivalent to the analysis-target abstract code before rearranging in a result of execution; and determining that the inspection-target execution code is a fraudulent program when the analysis-target abstract code after rearranging the analysis-target factor codes at least partly includes the known factor code, and a state at an end of execution of the inspection-target execution code is included in the success state information.

9. A non-transitory computer readable storage medium storing a computer program causing a computer to execute:

generating an analysis-target abstract code that is data representing a mathematical model into which an inspection-target execution code is transformed;

determining whether or not the inspection-target execution code is a fraudulent program by executing at least processing of determining whether or not the analysis-target abstract code includes a known factor code that is data representing a mathematical model into which a known execution code is transformed, and processing of determining whether or not a state at an end of execution of the inspection-target execution code is included in success state information indicating a state in which an attack by a fraudulent program is successful;

determining that the inspection-target execution code is a fraudulent program when the analysis-target abstract code includes the known factor code and a state at an end of execution of the inspection-target execution code is included in the success state information;

decomposing the analysis-target abstract code into analysis-target factor codes being relatively prime factor codes that do not have a dependence between a factor code and another factor code in which a variable in an output vector is included in common when the known factor code is determined to be not included in the analysis-target abstract code;

executing processing of determining whether or not the known factor code is included in the analysis-target abstract code after rearranging the analysis-target factor codes at least partly when the decomposed analysis-target factor codes which are rearranged at least partly is equivalent to the analysis-target abstract code before rearranging in a result of execution; and determining that the inspection-target execution code is a fraudulent program when the analysis-target abstract code after rearranging the analysis-target factor codes at least partly includes the known factor code, and a state at an end of execution of the inspection-target execution code is included in the success state information.

* * * * *